(12) United States Patent
Takeshima et al.

(10) Patent No.: US 7,618,063 B2
(45) Date of Patent: Nov. 17, 2009

(54) VEHICLE BODY FRAME STRUCTURE FOR ALL-TERRAIN VEHICLE

(75) Inventors: Masao Takeshima, Wako (JP); Kosuke Asao, Wako (JP); Shinji Takahashi, Wako (JP); Yuichiro Tsuruta, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 339 days.

(21) Appl. No.: 11/055,722

(22) Filed: Feb. 11, 2005

(65) Prior Publication Data

US 2005/0178603 A1 Aug. 18, 2005

(30) Foreign Application Priority Data

Feb. 13, 2004 (JP) ............................. 2004-036281
Mar. 29, 2004 (JP) ............................. 2004-096843
Mar. 29, 2004 (JP) ............................. 2004-096888

(51) Int. Cl.
 *B62D 21/12* (2006.01)
 *B62D 21/00* (2006.01)

(52) U.S. Cl. ............................... 280/785; 280/124.135; 180/311

(58) Field of Classification Search ................. 280/785, 280/781, 124.135; 180/312
See application file for complete search history.

(56) References Cited

U.S. PATENT DOCUMENTS

| | | | | |
|---|---|---|---|---|
| 4,533,172 A | * | 8/1985 | Oliver ................. | 296/203.01 |
| 4,786,075 A | | 11/1988 | Takahashi | |
| 4,881,756 A | * | 11/1989 | Kumasaka et al. .......... | 280/785 |
| 5,401,056 A | * | 3/1995 | Eastman ................ | 280/785 |
| 6,286,619 B1 | | 9/2001 | Uchiyama et al. | |
| 6,296,163 B1 | | 10/2001 | Kitao et al. | |
| 6,412,856 B1 | * | 7/2002 | Kajikawa et al. ....... | 296/203.01 |
| 6,547,027 B1 | * | 4/2003 | Kalhok et al. ............ | 180/312 |
| 6,702,058 B2 | * | 3/2004 | Ishii et al. ............... | 180/311 |
| 6,799,781 B2 | * | 10/2004 | Rasidescu et al. ........... | 280/781 |
| 6,827,361 B2 | * | 12/2004 | Seki ................... | 280/124.134 |
| 7,306,069 B2 | * | 12/2007 | Takeshima et al. ......... | 180/312 |
| 2001/0027890 A1 | | 10/2001 | Bria et al. | |
| 2001/0048207 A1 | * | 12/2001 | Handa ................ | 280/124.135 |
| 2003/0006573 A1 | * | 1/2003 | Seki .................... | 280/124.135 |
| 2003/0066696 A1 | | 4/2003 | Nakamura | |

FOREIGN PATENT DOCUMENTS

| | | |
|---|---|---|
| JP | 63-170176 | 7/1988 |
| JP | 02-048291 A | 2/1990 |
| JP | 02-048294 A | 2/1990 |
| JP | 2000-033894 A | 2/2000 |
| JP | 3069309 | 5/2000 |
| JP | 3358876 | 10/2002 |

* cited by examiner

*Primary Examiner*—Paul N Dickson
*Assistant Examiner*—Drew Brown
(74) *Attorney, Agent, or Firm*—Westerman, Hattori, Daniels & Adrian, LLP

(57) ABSTRACT

A vehicle body frame structure for an all-terrain vehicle having at least a front wheel, and including a first frame assembly and a second frame assembly. The first frame assembly includes an arm support portion and a steering shaft support portion located at a front portion of the vehicle body frame structure, for steering the front wheel. The second frame assembly is bisected from the first frame assembly; and the vehicle body frame structure also includes a suspension arm vertically swingably supported by the arm support portion.

4 Claims, 20 Drawing Sheets

VEHICLE BODY FRAME STRUCTURE FOR ALL-TERRAIN VEHICLE

FIELD OF THE INVENTION

The present invention relates to a vehicle body frame structure for an all-terrain vehicle such as a buggy.

BACKGROUND OF THE INVENTION

In general, a vehicle body frame structure for an all-terrain vehicle (hereinafter referred to as an "ATV"), wherein the vehicle body frame is of a bisected structure has been known.

Such is disclosed, for instance, in Japanese Patent Laid-open No. Sho 63-170176. FIG. 2 of Japanese Patent Laid-open No. Sho 63-170176 will be described referring to FIG. 8 below.

FIG. 8 is a perspective view of a conventional vehicle body frame structure for an ATV, in which a vehicle body frame 201 is composed of an upper vehicle body frame 202, a lower vehicle body frame 203 connected to a lower portion of the upper vehicle body frame 202, and cushion brackets 204 (only one on one side is shown) connected respectively to front portions of the upper vehicle body frame 202 and the lower vehicle body frame 203.

The upper vehicle body frame 202 is composed of a main frame 206, a left-right pair of center frames 207, 208 formed integrally with the main frame 206, a down tube 211 extended forwardly downwards from the front end of the main frame 206, a front member 212 extended downwards from a front portion of the down tube 211, and a back stay 213 extended downwardly rearwards from a rear portion of the down tube 211.

The lower vehicle body frame 203 is composed of a left-right pair of a left bottom frame 215 and a right bottom frame 216, and cross members 217, 218 disposed bridgingly between rear portions of the left bottom frame 215 and the right bottom frame 216.

The cushion bracket 204 is a member abutted on both side surfaces of a front vehicle body frame assembly 221 and welded at outer peripheral portions thereof, wherein the front vehicle body frame assembly 221 is formed by connecting the lower vehicle body frame 203 to the down tube 211 and the front member 212.

The above-mentioned conventional vehicle body frame 201 is largely of a structure bisected into the upper vehicle body frame 202 and the lower vehicle body frame 203, in which the cushion brackets 204 for mounting suspension arms on the left and right sides are mounted bridgingly between the upper vehicle body frame 202 and the lower vehicle body frame 203. In this case, it is considered that the mounting accuracy of the cushion brackets 204 cannot be secured in some cases, depending on the dimensions of the down tube 211 and the front member 212 on the side of the upper vehicle body frame 202 and the dimensions of the left bottom frame 215 and the right bottom frame 216 on the side of the lower vehicle body frame 203.

As shown in Japanese Patent Laid-open No. Sho 63-170176, the cushion brackets 204 are members to which the suspension arms are attached, and, therefore, the cushion brackets 204 are required to be mounted with a high accuracy, so as not to influence the wheel alignment of front wheels.

Also, though not shown in the figure, a steering shaft for steering the front wheels is generally supported at upper and lower two positions of the vehicle body frame. For example, in the case where support portions for the steering shaft are provided respectively on the side of the upper vehicle body frame 202 and on the side of the lower vehicle body frame 203 in the figure, the arrangement in which the support portions are not present on the same frame side makes it difficult to enhance the mounting accuracy of the steering shaft. The mounting accuracy of the steering shaft relates to the steering force on the steering handle, the steering angle of the front wheels, and the like, so that an enhancement of the mounting accuracy is demanded.

Also, in the conventional structure, the cushion brackets 204 are mounted to the upper vehicle body frame 202 and the lower vehicle body frame 203 leads to an increase in the number of mounting steps, as compared with a structure in which the upper vehicle body frame 202 and the lower vehicle body frame 203 are simply connected to each other.

Accordingly, it is an object of the present invention to improve a vehicle body frame structure for an ATV, so as thereby to enhance the mounting accuracies of suspension arm support portions and a steering shaft support portion in a vehicle body frame and to reduce the number of steps for mounting the vehicle body frame.

In general, a vehicle body frame structure for an ATV, wherein the rear wheels are supported by double wishbone type independent suspensions, has been known. Such is disclosed, for instance, in Japanese Patent No. 3069309, wherein a vehicle body frame includes a left-right pair of lower tubes having rear portions so bent as to rise upwards, a cross tube disposed bridgingly between the lower tubes, a left-right pair of rear upper tubes connected to the rear ends of the lower tubes, a left-right pair of rear tubes disposed on the rear side of the lower tubes and each having one end connected to the rear upper tube and the other end connected to the cross tube, and a left-right pair of connection tubes connected respectively to the lower tubes and the rear tubes. In addition, upper arms are vertically swingably mounted respectively to the left and right connection tubes, tension rods are swingably mounted respectively to lower portions of the left and right tubes, and rear wheels are mounted to the bottom ends of the upper arms and the tension rods through knuckles.

One problem with this disclosure is that the upper arms are supported by upper arm support portions provided in the connection tubes, and the tension rods are supported by tension rod support portions provided at lower portions of the lower tubes. In this case, the upper arm support portions and the tension rod support portions are portions for supporting the rear wheels through the upper arms and the tension rods, and are members influencing the wheel alignment of the rear wheels, so that they need higher positional accuracies.

Also, the portions of the vehicle body frame which do not need high accuracies are easier to assemble. Therefore, when the vehicle body frame is divided into the portions needing high accuracies and the other portions, both accuracy and assemblability can be enhanced at the time of assembling the vehicle body frame.

Thus, it is an object of the present invention to enhance positional accuracy of suspension arm support portions and to enhance assemblability of an ATV vehicle body frame.

In general, a cover for covering a lateral side of an ATV, such as a fuel tank cover, a front fender, and a rear fender, have been know. Such is disclosed, for example, in Japanese Patent No. 3358876

FIG. 1 of Japanese Patent No. 3358876 will be described referring to FIG. 22 below. FIG. 22 is a side view of a conventional ATV. The ATV 212 comprises a fuel tank cover 806 covering a lateral upper side of the power unit 804; a front fender 807 covering a front lateral side of the engine 802; a rear fender 808 covering a rear lateral side of the power unit

804; and an opening portion 811 defined by the fuel tank cover 806, the front fender 807, and the rear fender 808.

It may be desired to make the opening portion 811 smaller for further enhancing the aesthetic quality as viewed from a lateral side of the vehicle. However, when the opening portion 811 is made smaller, it negatively affects the maintainability of the engine 802 and the transmission 803.

In view of the above, the fuel tank cover 806, the front fender 807, and the rear fender 808 may be detached at the time of maintenance, whereby the maintenance property can be secured though the opening portion 811 that is small. However, the work for detaching the fuel tank cover 806, the front fender 807, and the rear fender 808 would be troublesome.

In addition, the fuel tank cover 806, the front fender 807, and the rear fender 808 are desired to be enhanced in rigidity so that they will not show resonance upon vibrations at the time of running of the vehicle or due to engine vibrations, for example.

Thus, it is an object of the present invention to improve a side cover for an ATV, thereby enhancing the maintainability of a power unit, particularly an engine, and enhancing the rigidity of the side cover.

SUMMARY OF THE INVENTION

The present invention addresses the above described conditions. According to the present invention, an ATV having arm support portions at left and right positions of a front portion of a vehicle body frame, suspension arms vertically swingably supported respectively by the arm support portions, front wheels disposed on the bottom end side of the suspension arms, and shaft support portion for supporting a steering shaft. The shaft support portions are provided at front portions of the vehicle body frame for steering the front wheels. The vehicle body frame is of a bisected structure having a first frame assembly, which includes the arm support portions and the shaft support portions, and a second frame assembly. Thus, the arm support portions and the shaft support portions, which need mounting accuracies, are not separated to the side of the first frame assembly and to the side of the second frame assembly. Therefore, the respective mounting accuracies of the arm support portions and the shaft support portions are enhanced.

Also, because only the first frame assembly and the second frame assembly need assembling, the number of assembling steps can be reduced and the assembly time can be shortened, as compared with the conventional structure in which sectioned frame assemblies are assembled.

It is also possible to easily set the wheel alignment of the front wheels into a predetermined range, and to perform a steering angle adjustment for the front wheels with a higher accuracy, which reduces the steering force on the steering handle.

In another embodiment of the present invention, at least one closed loop is formed in the first frame assembly. As a result, the rigidity of the first frame assembly can be further enhanced, as compared with, for example, a frame assembly which does not have a closed loop. In addition the support rigidity of the suspension arms and the steering shaft is enhanced.

In another embodiment of the present invention, the vehicle body frame is of a structure in which the first frame assembly and the second frame assembly are separate from each other to the upper and lower sides. This ensures that the first frame assembly and the second frame assembly are coupled to each other by mounting one of them on the other of them, and the vehicle body frame can be assembled easily.

In another embodiment, a vehicle body frame structure for an ATV is provided having rear upper arm support portions and rear lower arm support portions at rear portions of a vehicle body frame, for supporting upper and lower suspension arms for independently suspending left and right rear wheels. The vehicle body frame is split into a plurality of assemblies, and the rear upper arm support portions and the rear lower arm support portions are included in one of the assemblies. As a result, the positional accuracies of the rear upper arm support portions and the rear lower arm support portions can be further enhanced, as compared with, for example, a structure in which the rear upper arm support portions and the rear lower arm support portions are included respectively in separate assemblies. Also, the accuracy of mounting the upper and lower suspension arms to the rear upper arm support portions and the rear lower arm support portions can be enhanced, and the wheel alignment of the rear wheels can be easily set into a predetermined range. In addition, the assemblies not including the rear upper arm support portions and the rear lower arm support portions can themselves be assembled easily, and the cost of the vehicle body frame can be reduced.

In another embodiment, the vehicle body frame includes three assemblies comprising of a front assembly, a rear assembly, and an intermediate assembly disposed therebetween. The front assembly includes the shaft support portions for supporting a steering shaft, the front upper arm and lower arm support portions for supporting upper and lower suspension arms for independently suspending left and right front wheels.

According to this embodiment, the positional accuracies of the front upper arm support portions and the front lower arm support portions can be further enhanced, as compared with, for example, a structure in which the front upper arm support portions and the front lower arm support portions are included respectively in separate assemblies. Also, the accuracy of mounting the upper and lower suspension arms to the front upper arm support portions and the front lower arm support portions can be enhanced, and the wheel alignment of the front wheels can be easily set into a predetermined range. In addition, the intermediate assembly not including the portions needing high accuracy can itself be easily assembled, and the cost of the vehicle body frame can be reduced.

Further, where the portions needing high accuracy are separately included in separate assemblies, a high technique is required to assemble these assemblies onto each other. According to the present invention, on the other hand, the shaft support portions, the front upper arm support portions, and the front lower arm support portions are collectively included in one assembly, so that the front assembly and the intermediate assembly can be easily mounted to each other.

Further, since the shaft support portions, the front upper arm support portions, and the front lower arm support portions are collectively included in one assembly, the front assembly and the intermediate assembly can be easily mounted to each other, the assemblability of the vehicle body frame can be enhanced, and the cost of the vehicle body frame can be reduced.

In another embodiment, the vehicle body frame includes three assemblies consisting of a front assembly, a rear assembly, and an intermediate assembly disposed therebetween, and the intermediate assembly includes a part of the shaft support portions for supporting the steering shaft. The intermediate assembly includes the shaft support portions, whereby the shaft support portions can be supported by the intermediate assembly which is enhanced in rigidity by being clamped between the front assembly and the rear assembly. As a result, the steering shaft can be firmly supported.

In another embodiment, the front assembly, the rear assembly, and the intermediate assembly are each provided with at least one closed loop. According to this embodiment, the respective rigidities of the front assembly, the rear assembly, and the intermediate assembly can be further enhanced, as compared with, for example, assemblies not having a closed loop. As a result, the support rigidities of the suspension arms and the steering shaft can be enhanced.

In another embodiment, a side cover for an ATV is provided, wherein a cover member for covering a front lateral side of the engine is removably attached to the body cover, the floor step, and the front fender, and the side cover includes the body cover, the floor steps, the front fender, and the cover member. The cover member is supported by the body cover, the floor step, and the front fender which are disposed in the surroundings of the cover member According to this embodiment, the rigidity of the side cover comprising the body cover, the floor step, the front fender, the side cover, and the cover member is further enhanced, and resonance of the side cover can be prevented. Also, by removing only the cover member, it is possible to more easily expose a front portion of the engine to the exterior. For example, it is possible to easily perform an adjustment at an operating position adjusting portion of a clutch provided at a front portion of the engine, and the maintainability of the power unit can be further enhanced.

In another embodiment, the cover member is supported by only the body cover, the floor step, and the front fender. Conventionally, where the cover member is mounted to the vehicle body frame, mount portions such as stays for the cover member must be provided on the vehicle body frame side. However, in the present invention, the cover member is only attached to the surrounding covers. Therefore, since it is unnecessary to mount the cover member to the vehicle body frame, the mount structure for the cover member can be simplified, and the cost can be reduced.

In another embodiment the cover member is substantially flush with the body cover, the floor step, and the front cover. Thus, it is possible to enhance the aesthetic quality on a lateral side of the saddle ride type all terrain vehicle and the commercial value of the ATV can be enhanced.

In another embodiment, an opening portion is defined by the cover member, the body cover, the floor step, and the front fender. As a result, the area of the opening portion can be further reduced, and the aesthetic quality as viewed from a lateral side of the vehicle can be further enhanced.

BRIEF DESCRIPTION OF THE DRAWINGS

A preferred embodiment of the present invention will be described with reference to the accompanying drawings, wherein.

DETAILED DESCRIPTION OF THE INVENTION

Embodiments of the present invention will be described hereinafter with reference to the accompanying drawings.

Figure 1:
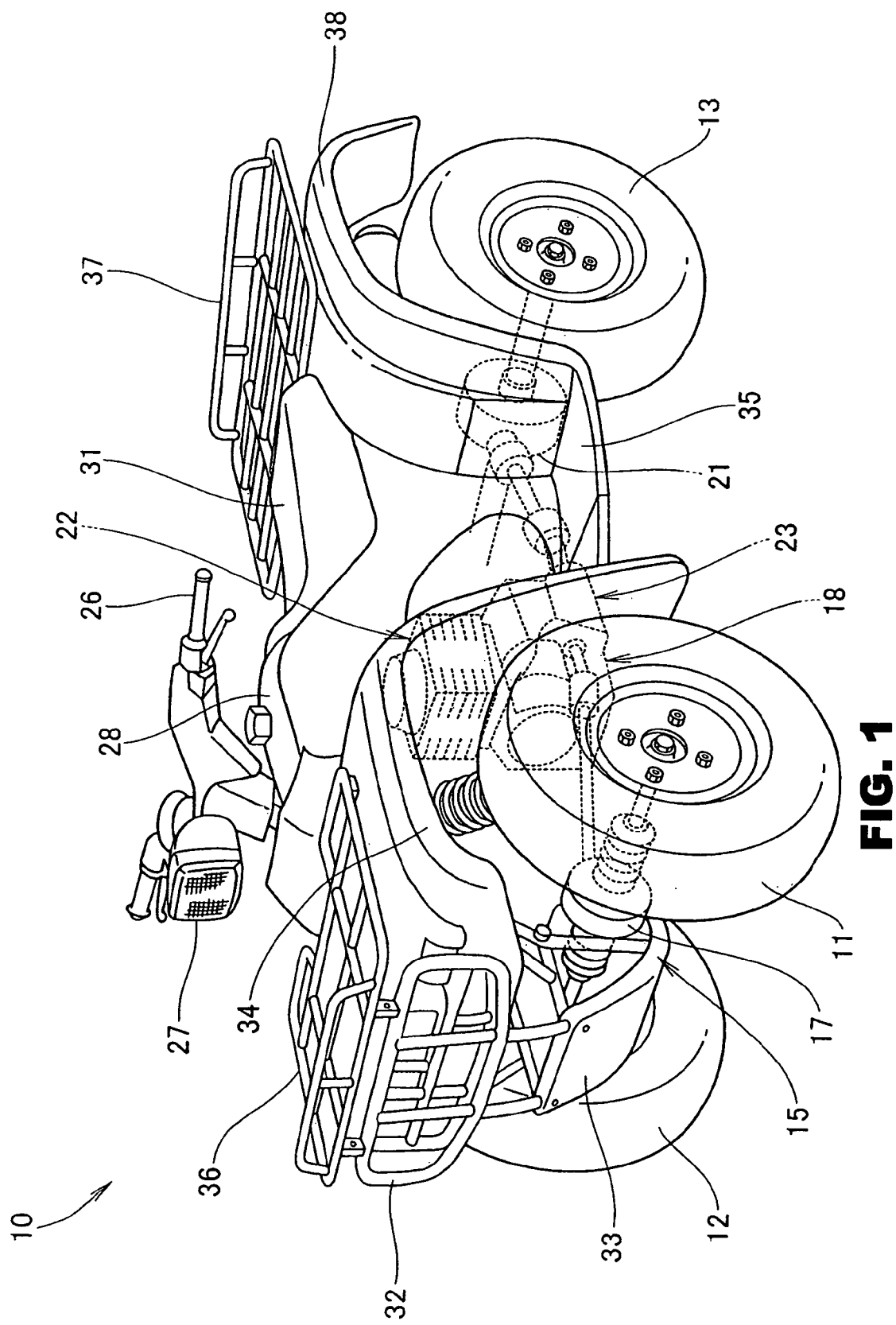
FIG. 1 is a perspective view of an ATV adopting a vehicle body frame structure according to the present invention.

FIG. 1 is a perspective view of an ATV adopting a vehicle body frame structure according to the present invention, in which the ATV 10 is a vehicle having a structure in which left and right front wheels 11, 12 and left and right rear wheels 13, 14 (only reference numeral 13 on the viewer's side is shown) are supported by suspension arms (not shown) vertically movably mounted to a vehicle body frame 15, the front wheels 11, 12 are connected to a power unit 18 at a roughly central position of the vehicle body through a front speed reduction gear 17, the rear wheels 13, 14 are connected to the power unit 18 through a rear speed reduction gear 21, and the front wheels 11, 12 are steered by a steering handle 26 through a steering shaft (not shown).

The power unit 18 is composed of an engine 22, and a transmission 23 connected to an output shaft of the engine 22.

Here, reference numeral 27 denotes a headlamp; 28 denotes a fuel tank; 31 denotes a seat; 32 denotes a front guard for protecting the vehicle body front surface; 33 denotes a front under cover for protecting a front-side suspension and a power transmission system; 34, 34 (only reference numeral 34 on the viewer's side is shown) denote front fenders for covering the upper and rear sides of front wheels 11, 12; 35, 35 (only reference numeral 35 on the viewer's side is shown) denote steps for the driver to put his feet on; 36, 37 denote respectively a front carrier and a rear carrier for mounting luggage thereon; and 38, 38 (only reference numeral 38 on the viewer's side is shown) denote rear fenders for covering the front and upper sides of rear wheels 13, 14.

Figure 2:
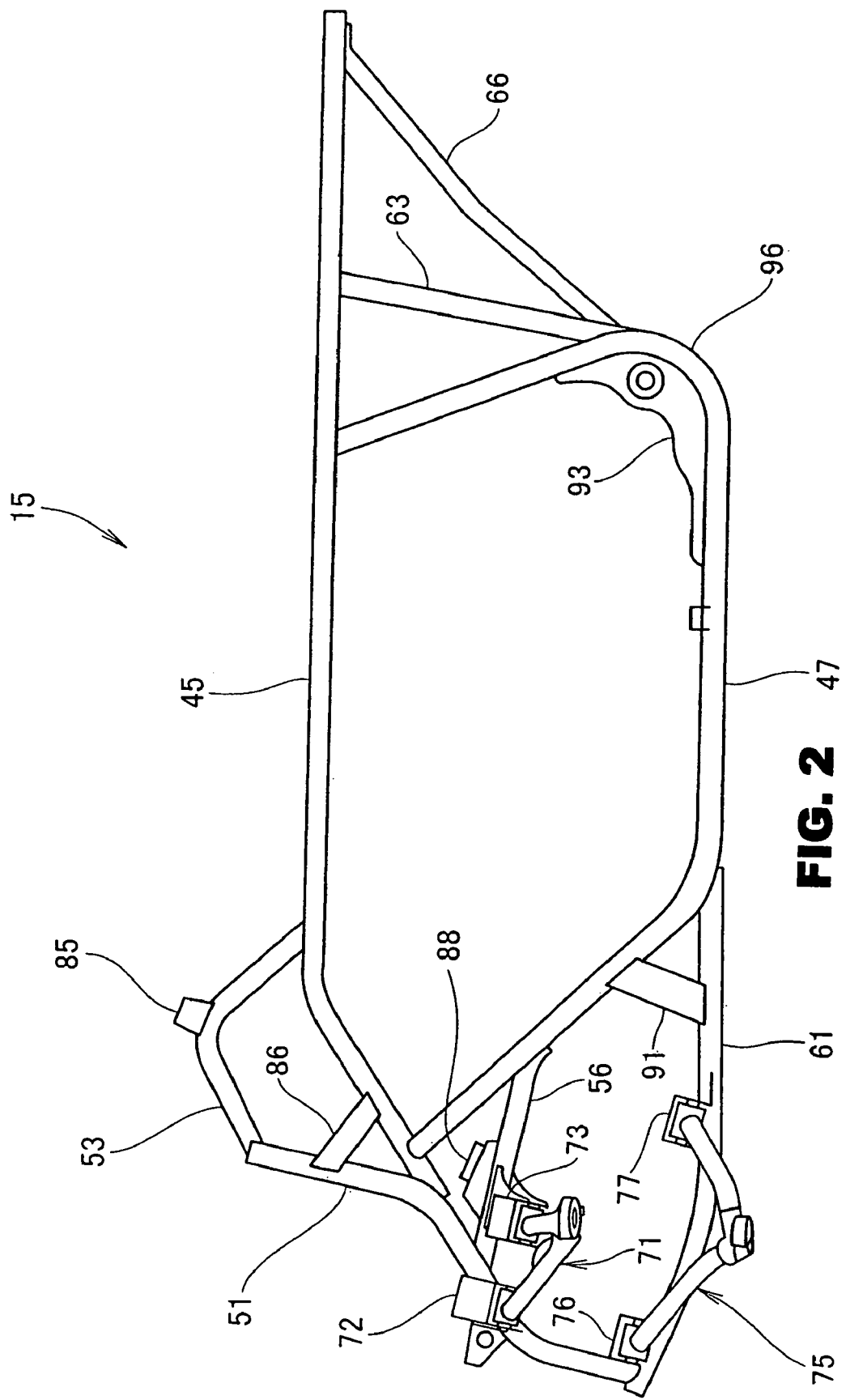
FIG. 2 is a side view showing the vehicle body frame according to the present invention.

FIG. 2 is a side view showing a vehicle body frame 15 according to the present invention, in which the arrow (FRONT) denotes the vehicle front side (here and hereinafter).

The vehicle body frame 15 is composed of: left and right upper main frames 45, 46 (only reference numeral 45 on the viewer's side is shown) extended in the front-rear direction; roughly U-shaped lower main frames 47, 48 (only reference numeral 47 on the viewer's side is shown) mounted to front end lower portions and rear lower portions of the upper main frames 45, 46; crank-shaped front frames 51, 52 (only reference numeral 51 on the viewer's side is shown) connected to the respective front ends of the upper main frames 45, 46; L-shaped frames 53, 54 (only reference numeral 53 on the viewer's side is shown) connected respectively to the upper end side of the front frames 51, 52 and the upper portion side of the upper main frames 45, 46; inclined frames 56, 57 (only reference numeral 56 on the viewer's side is shown) disposed bridgingly respectively between the front frames 51, 52 and the lower main frames 47, 48; front lower frames 61, 62 (only reference numeral 61 on the viewer's side is shown) disposed bridgingly respectively between lower end portions of the front frames 51, 52 and front lower portions of the lower main frames 47, 48; rear riser frames 63, 64 (only reference numeral 63 on the viewer's side is shown) raised from rear lower portions of the lower main frames 47, 48 and connected to rear portions of the upper main frames 45, 46; and rear inclined frames 66, 67 (only reference numeral 66 on the viewer's side is shown) inclined from lower end portions of the rear riser frames 63, 64 and connected to the upper main frames 45, 46.

In the figure, reference numeral 71 denotes a left upper arm as a suspension arm for supporting the front wheel 11 (see FIG. 1), and the left upper arm 71 is vertically movably supported by one end of a first arm support bracket 72 disposed bridgingly between the left and right front frames 51, 52 and a second arm support bracket 73 mounted to the inclined frame 56.

Reference numeral 75 denotes a left lower arm as a suspension arm for supporting the front wheel 11, and is vertically movably supported by one end of a third arm support bracket 76 disposed bridgingly between the front lower frames 61, 62 and one end of a fourth arm support bracket 77 similarly disposed bridgingly between the front lower arms 61, 62.

In addition, a right upper arm 81 (not shown, and will be described referring to FIG. 4) as a suspension arm for supporting the front wheel 12 (see FIG. 1) is vertically movably supported by the other end of the first arm support bracket 72 and a second arm support bracket 74 (not shown) mounted to an inclined frame 57 (not shown).

A right lower arm 82 (not shown, and will be described referring to FIG. 4) as a suspension arm for supporting the front wheel 12 is vertically movably supported by the other end of the third arm support bracket 76 and the other end of the fourth arm support bracket 77.

Reference numeral 85 denotes an upper shaft support portion mounted to the L-shaped frames 53, 54 for supporting an upper portion of a steering shaft which will be described later; 86, 87 (only reference numeral 86 on the viewer's side is shown) denote left and right reinforcement members disposed bridgingly between the front frames 51, 52 and the upper main frames 45, 46; 88 denotes a lower shaft support portion mounted to the inclined frames 56, 57 for supporting a lower portion of the steering shaft; 91, 92 (only reference numeral 91 on the viewer's side is shown) denote left and right reinforcement members disposed bridgingly between the lower main frames 47, 48 and the front lower arms 61, 62; and 93, 94 (only reference numeral 93 on the viewer's side is shown) denote pivot plates mounted to rear bent portions 96, 97 (only reference numeral 96 on the viewer's side is shown) of the lower main frames 47, 48 so as thereby to support the swing axis of rear-wheel swing arms (not shown.)

Figure 3:
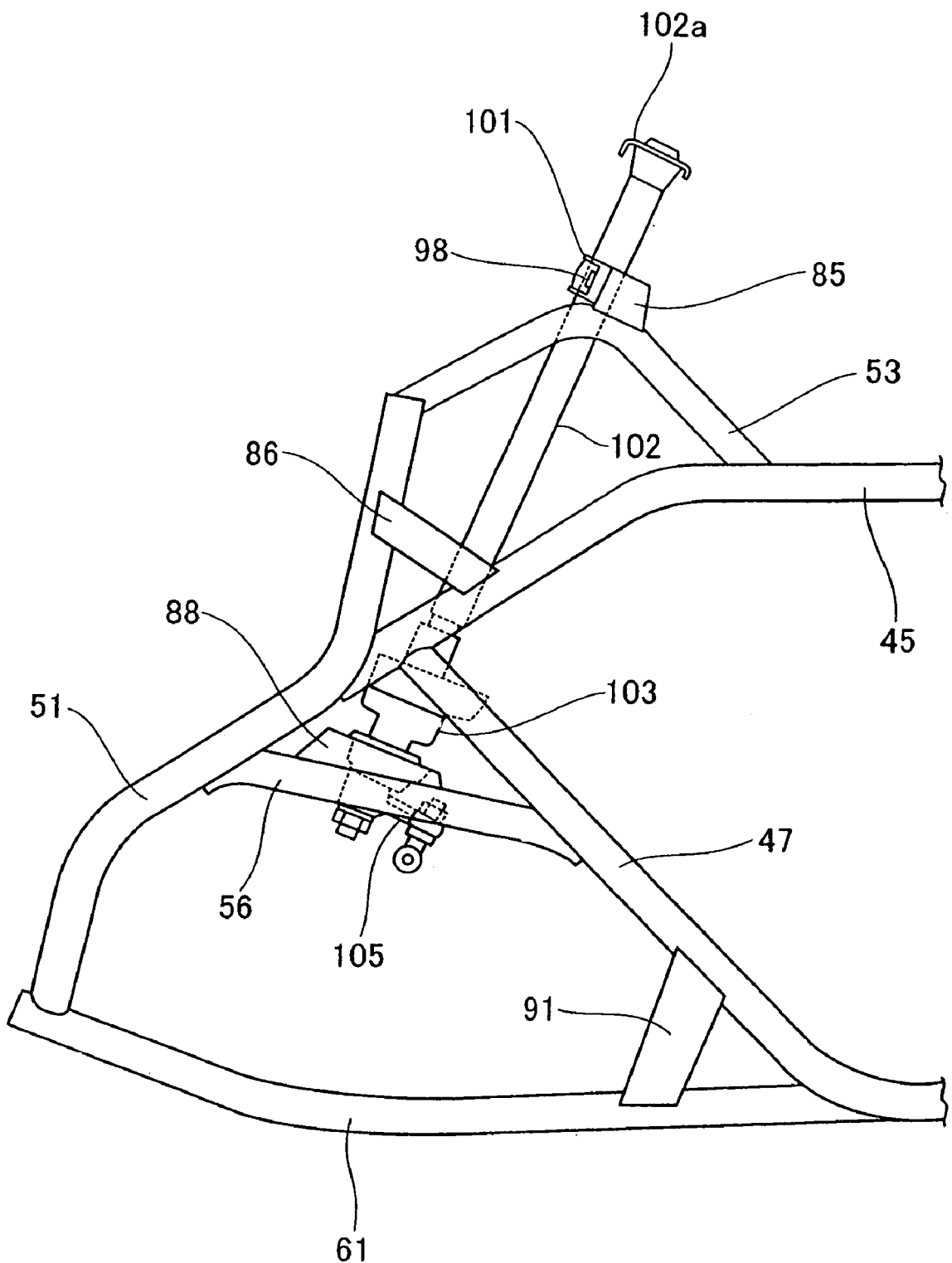
FIG. 3 is a side view showing a steering shaft support condition in the vehicle body frame according to the present invention.

FIG. 3 is a side view showing a steering shaft support condition of the vehicle body frame according to the present invention. In this figure, an upper portion of the steering shaft 102 is supported by the upper shaft support portion 85 disposed bridgingly between the L-shaped frames 53, 54 (only reference numeral 53 on the viewer's side is shown) and by a shaft support bracket 101 attached to the upper shaft support portion 85 by two bolts 98, and a lower portion of the steering shaft 102 is supported by mounting a shaft support member 103, for rotatably supporting the steering shaft 102, to the lower shaft support portion 88. A steering handle bracket 102a is mounted to the upper end of the steering shaft 102 for the purpose of mounting the steering handle 26. A steering arm 105 is mounted to a lower portion of the steering shaft 102 for the purpose of steering the front wheels 11, 12 (see FIG. 1) through tie rods and knuckles (which are not shown.)

Figure 4:
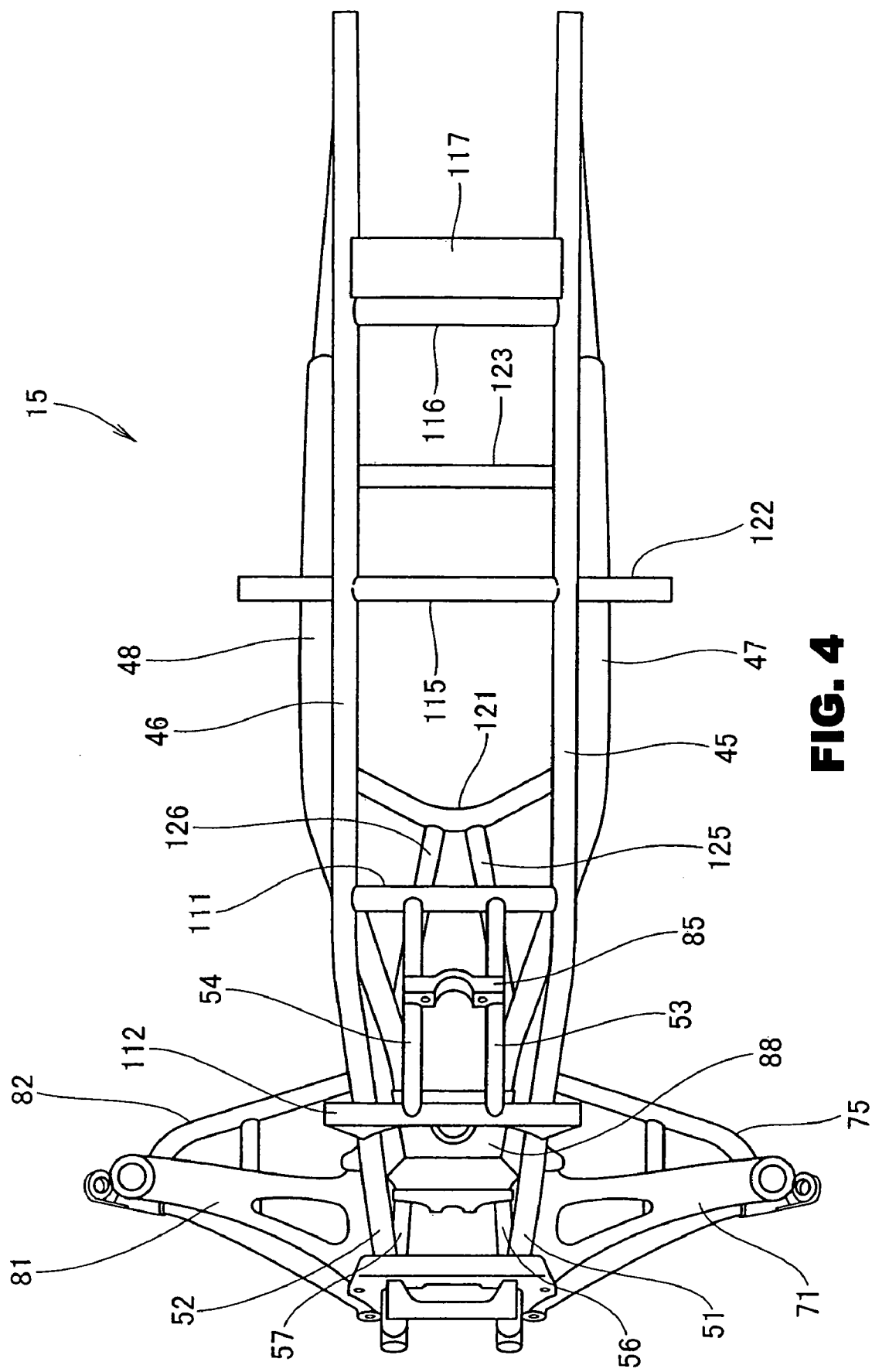
FIG. 4 is a plan view showing the vehicle body frame according to the present invention.

FIG. 4 is a plan view of the vehicle body frame according to the present invention. The vehicle body frame 15 has a structure in which the upper main frames 45, 46 are extended so as to widen rearward from the front ends thereof and extended substantially in parallel rearward from intermediate portions thereof. Also, a first upper cross member 111 is disposed bridgingly between the upper main frames 45, 46 and an upper bracket 112 is disposed bridgingly between the upper ends of the left and right front frames 51, 52. The L-shaped frames 53, 54 are disposed bridgingly, substantially in parallel, between the first upper cross member 111 and the upper bracket 112 and the upper shaft support portion 85 is disposed bridgingly between the L-shaped frames 53, 54. The lower shaft support portion 88 is disposed bridgingly between the left and right inclined frames 56, 57. The left upper arm 71, the right upper arm 81, the left lower arm 75, and the right lower arm 82 are extended respectively to the vehicle lateral sides.

Here, 115, 116, and 117 denote a second upper cross member, a third upper cross member, and a cross plate respectively, which are disposed bridgingly between the upper main frames 45 and 46. Also, 121, 122, and 123 denote a first lower cross member, a second lower cross member, and a third lower cross member respectively, which are disposed bridgingly between the lower main frames 47 and 48. Also, 125 and 126 denote cross pipes disposed slantly bridgingly between the first lower cross member 121 and the front lower frames 61, 62.

Figure 5:
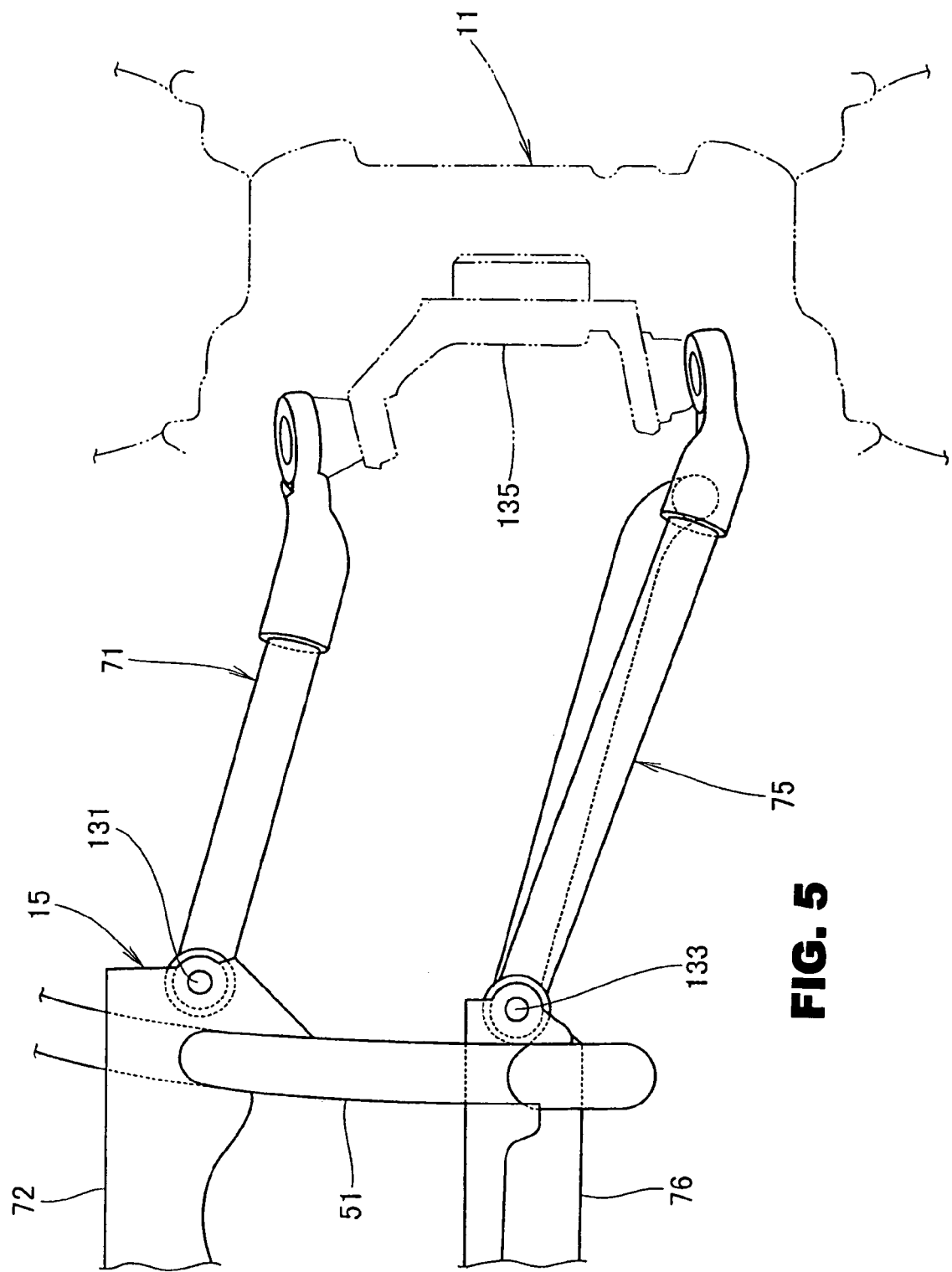
FIG. 5 is a front view showing a mount structure of suspension arms according to the present invention.

FIG. 5 is a side view showing a suspension arm mounting structure according to the present invention, in which a support shaft 131 is mounted to the first arm support bracket 72, a support shaft (not shown) is mounted to the second arm support bracket 73 (see FIG. 2), the left upper arm 71 is vertically swingably mounted to these support shafts. In addition, a support shaft 133 is mounted to the third arm support bracket 76, a support shaft (not shown) is mounted to the fourth arm support bracket 77 (see FIG. 2), the left lower arm 75 is vertically swingably mounted to these support shafts, and the respective bottom ends of the left upper arm 71 and the left lower arm 75 are connected to a knuckle 135.

The knuckle 135 is a member to which the front wheel 11 (see FIG. 11) is rotatably mounted through a hub (not shown).

The structure of mounting the right upper arm 81 (see FIG. 4) and the right lower arm 82 (see FIG. 4) supporting the front wheel 12 (see FIG. 1) to the vehicle body frame 15 is basically the same as that on the side of the front wheel 11, and description thereof is therefore omitted.

Figure 6:
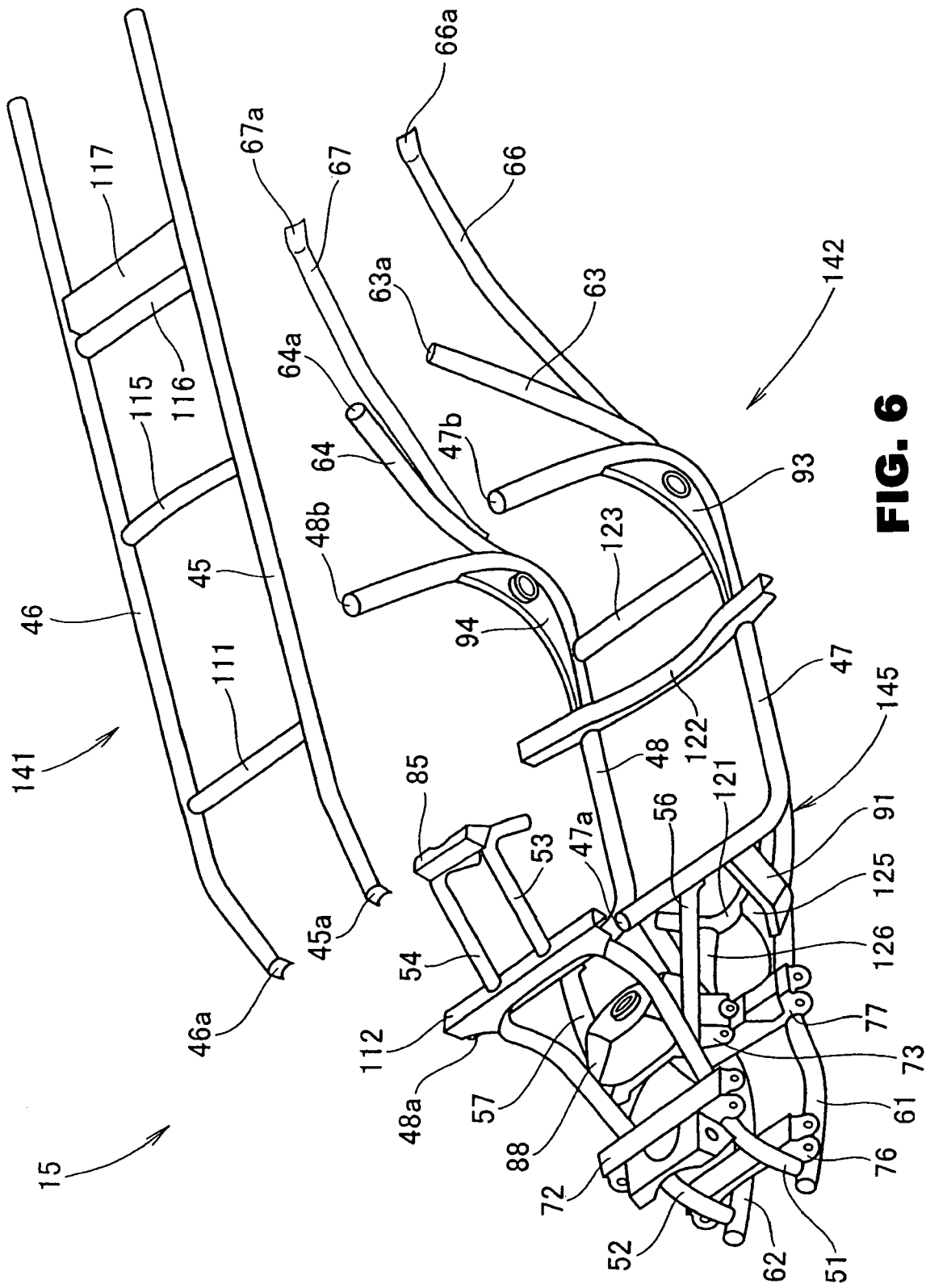
FIG. 6 is a perspective view showing a split structure of the vehicle body frame according to the present invention.

FIG. 6 is a perspective view showing the split structure of the vehicle body frame according to the present invention.

The vehicle body frame 15 is largely bisected (split into two) into the upper and lower sides, and is composed of an upper frame 141 as a second frame assembly, and a lower frame 142 as a first frame assembly connected to a lower portion of the upper frame 141.

For example, when the upper frame 141 and the lower frame 142 are preliminarily assembled in individual sub production lines and the upper frame 141 and the lower frame 142 are assembled to each other in the next main production line, assembly time can be shortened as compared with the case where the upper frame 141 and the lower frame 142 are assembled in one production line. This is one of the reasons why the vehicle body frame 15 is composed of separate assemblies.

The upper frame 141 is composed of the upper main frames 45, 46, the first upper cross member 111, the second upper cross member 115, the third upper cross member 116, and the cross plate 117. Incidentally, reference numerals 45a and 46a denote upper-side connection portions provided respectively at the front ends of the upper main frames 45, 46, for connection to the lower frame 142.

The lower frame 142 is the portion left upon excluding the upper frame 141 from the vehicle body frame 15. Namely, the lower frame 142 is composed of the lower main frames 47, 48, the front frames 51, 52, the L-shaped frames 53, 54, the inclined frames 56, 57, the front lower frames 61, 62, the rear riser frames 63, 64, the rear inclined frames 66, 67, the first arm support bracket 72, the second arm support brackets 73, 74 (reference numeral 74 is not shown), the third arm support bracket 76, the fourth arm support bracket 77, the upper shaft support portion 85, the reinforcement members 86, 87 (not shown), the lower shaft support portion 88, the reinforcement members 91, 92 (reference numeral 92 is not shown), the pivot plates 93, 94, the upper bracket 112, the first lower cross member 121, the second lower cross member 122, the third lower cross member 123, and the cross pipes 125, 126. Incidentally, reference numerals 66a and 67a denote lower-side connection portions provided respectively at the rear ends of the rear inclined frames 66, 67, for connection to the upper frame 141. Similarly, reference numerals 47a, 48a, 47b, 48b, 63a, and 64a are lower-side connection portions.

Thus, the lower frame 142 includes the upper shaft support portion 85 and the lower shaft support portion 88 which support the steering shaft 102 (see FIG. 3), and the first arm support bracket 72, the second arm support brackets 73, 74, the third arm support bracket 76, and the fourth arm support bracket 77 which support the suspension arms (the left upper arm 71, the left lower arm 75, the right upper arm 81, and the right lower arm 82 which are shown in FIG. 4).

In addition, the lower main frames 47, 48, the inclined frames 56, 57, the front frames 51, 52, and the front lower frames 61, 62 in the lower frame 142 are members forming a closed loop 145.

As has been described referring to FIGS. 3, 4 and 6 above, in one embodiment, the arm support portions (the first arm support bracket 72, the second arm support brackets 73, 74, the third arm support bracket 76, and the fourth arm support bracket 77) are provided at left and right positions of a front portion of the vehicle body frame 15, the suspension arms (the left upper arm 71, the left lower arm 75, the right upper arm 81, and the right lower arm 82) are vertically swingably supported respectively by these arm support members 72, 73, 74, 76, 77, the front wheels 11, 12 (see FIG. 1) are disposed on the bottom end side of these suspension arms 71, 75, 81, 82, and the shaft support portions (the upper shaft support portion 85 and the lower shaft support portion 88) for supporting the steering shaft 102 are provided at a front portion of the vehicle body frame 15 for the purpose of steering the front wheels 11, 12, the vehicle body frame 15 is of a bisected structure composed of the lower frame 142 as the first frame assembly including the arm support portions 72, 73, 74, 76, 77 and the shaft support portions 85, 88, and the upper frame 141 as the other second frame assembly.

Since the arm support portions 72, 73, 74, 76, 77 and the shaft support portions 85, 88 which need mounting accuracies are not separated into the lower frame 142 and the upper frame 141, it is possible to enhance the respective mounting accuracies of the arm support portions 72, 73, 74, 76, 77 and the shaft support portions 85, 88. Therefore, it is possible to easily set the wheel alignment of the front wheels 11, 12 into a predetermined range, and to easily achieve a reduction in the steering force on the steering handle 26 (see FIG. 1) and a steering angle adjustment for the front wheels 11, 12.

Further, since the lower frame 142 and the upper frame 141 are simply assembled, the number of assembling steps can be reduced and the assembly time can be shortened, as compared with the conventional structure in which separate frame assemblies are assembled.

The present invention is secondly characterized in that at least one closed loop 145 is formed in the lower frame 142.

With at least one closed loop 145 formed in the lower frame 142, according to the present invention, it is possible to further enhance the rigidity of the lower frame 142, as compared, for example, with a frame assembly which does not have a closed loop, and to enhance the support rigidities of the suspension arms 71, 75, 81, 82 and the steering shaft 102.

The present invention is thirdly characterized in that the vehicle body frame 15 is of a structure in which the lower frame 142 and the upper frame 141 are separate from each other to the lower and upper sides.

The structure in which the lower frame 142 and the upper frame 141 are separated from each other to the lower and upper sides ensures that the lower frame 142 and the upper frame 141 can be connected to each other by mounting one of them on the other of them, and the vehicle body frame 15 can be assembled easily.

Figure 7:
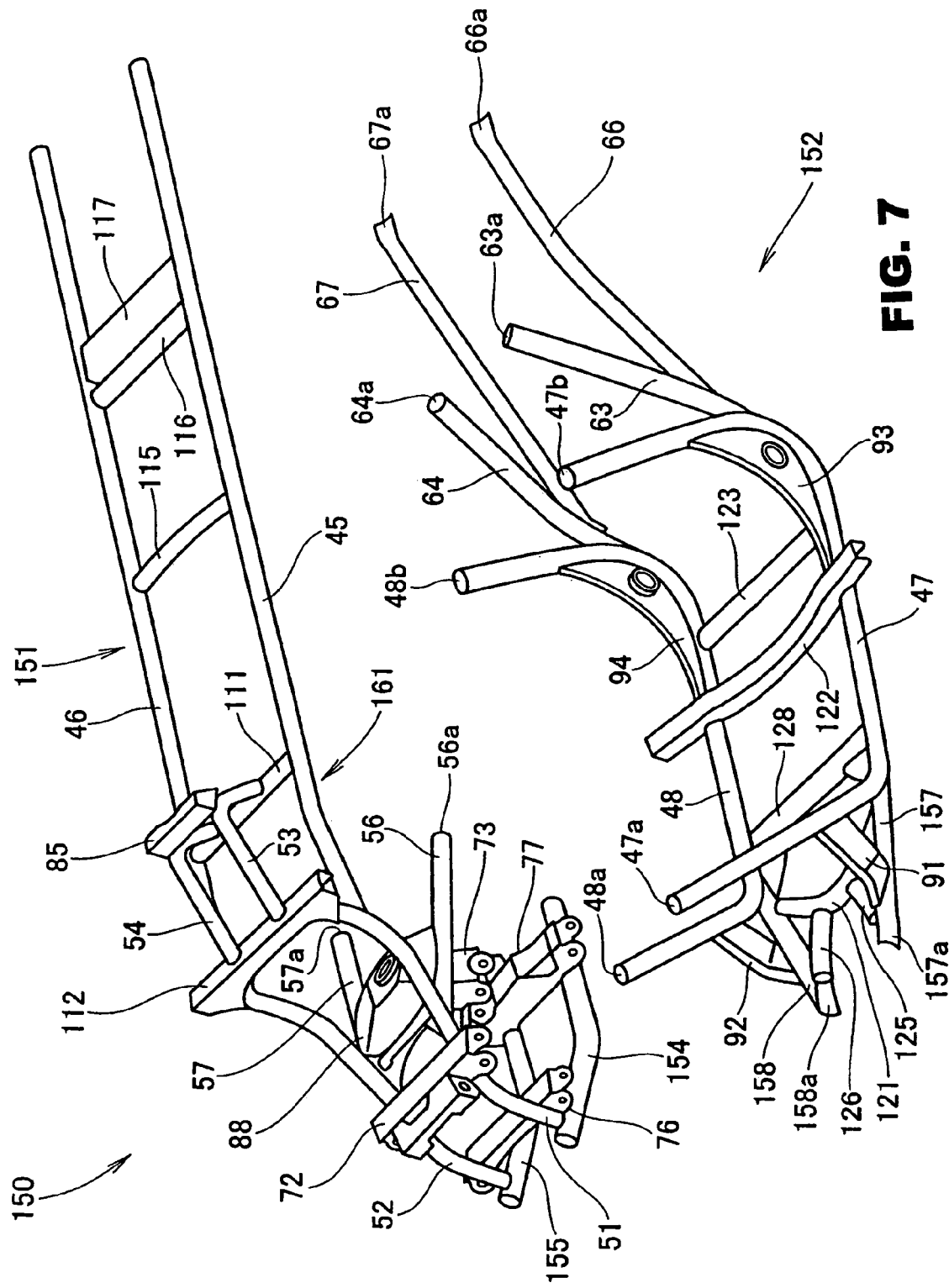
FIG. 7 is a perspective view showing another embodiment of the split structure of the vehicle body frame according to the present invention.
Figure 8:
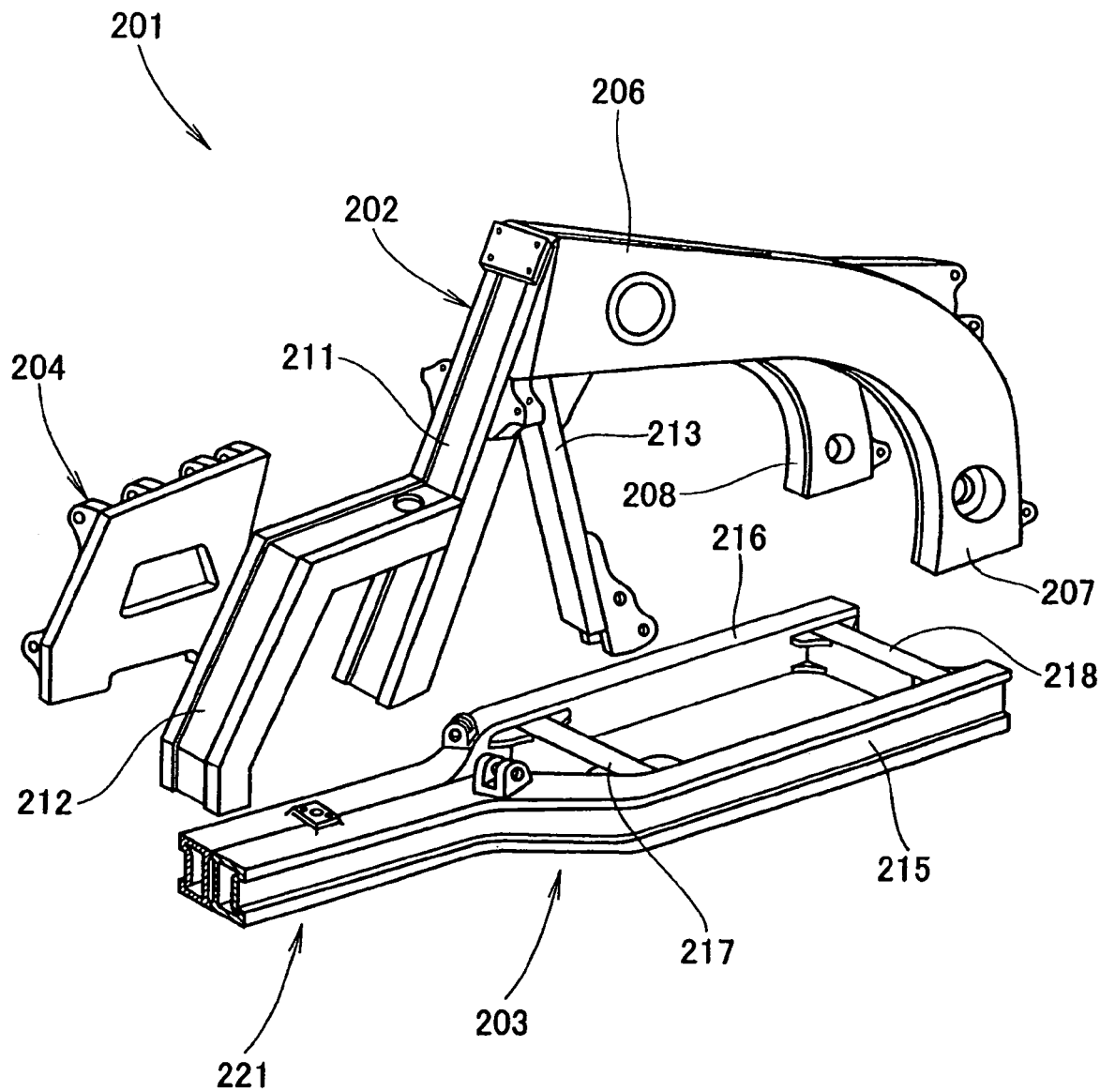
FIG. 8 is a perspective view showing a conventional vehicle body frame structure for an ATV.

FIG. 7 is a perspective view showing another embodiment of the split structure of the vehicle body frame according to the present invention.

The vehicle body frame 150 is largely bisected (split into two) into the upper and lower sides, and is composed of an upper frame 151 as a first frame assembly, and a lower frame 152 as a second frame assembly connected to a lower portion of the upper frame 151.

The upper frame 151 is composed of the upper main frames 45, 46, the front frames 51, 52, the first upper cross member 111, the upper bracket 112, the second upper cross member 115, the third upper cross member 116, the cross plate 117, front lower first frames 154, 155, the L-shaped frames 53, 54, the inclined frames 56, 57, the first arm support bracket 72, the second arm support brackets 73, 74 (reference numeral 74 is not shown), the third arm support bracket 76, the fourth arm support bracket 77, the upper shaft support portion 85, the reinforcement members 86, 87 (not shown), and the lower shaft support portion 88. Incidentally, reference numerals 56a and 57a denote upper-side connection portions for connection to the lower frame 152.

The lower frame 152 is a portion left upon excluding the upper frame 151 from the vehicle body frame 150. Namely, the lower frame 152 is composed of the lower main frames 47, 48, front lower second frames 157, 158, the rear riser frames 63, 64, the rear inclined frames 66, 67, the reinforcement members 91, 92, the pivot plates 93, 94, the first lower cross member 121, the second lower cross member 122, the third lower cross member 123, the cross pipes 125, 126, and the fourth lower cross member 128. Incidentally, reference numerals 157a and 158a denote lower-side connection portions provided at front end portions of the front lower second frames 157, 158 of the lower frame 152, for connection to rear end portions of the front lower first frames 154, 155 of the upper frame 151.

The front lower first frame 154 and the front lower second frame 157 correspond to the front lower frame 61 shown in FIG. 2, and the front lower first frame 155 and the front lower second frame 158 correspond to the front lower frame 62 shown in FIG. 2.

Thus, the upper frame 151 includes the upper shaft support portion 85 and the lower shaft support portion 88 which support the steering shaft 102 (see FIG. 3), and the first arm support bracket 72, the second arm support brackets 73, 74, the third arm support bracket 76, and the fourth arm support bracket 77 which support the suspension arms (the left upper arm 71, the left lower arm 75, the right upper arm 81, and the right lower arm 82 which are shown in FIG. 4).

In addition, the upper main frames 45, 46, the front frames 51, 52, the upper bracket 112, the L-shaped frames 53, 54, and the first upper cross member 111 in the upper frame 151 are members forming a closed loop 161.

Figure 9:
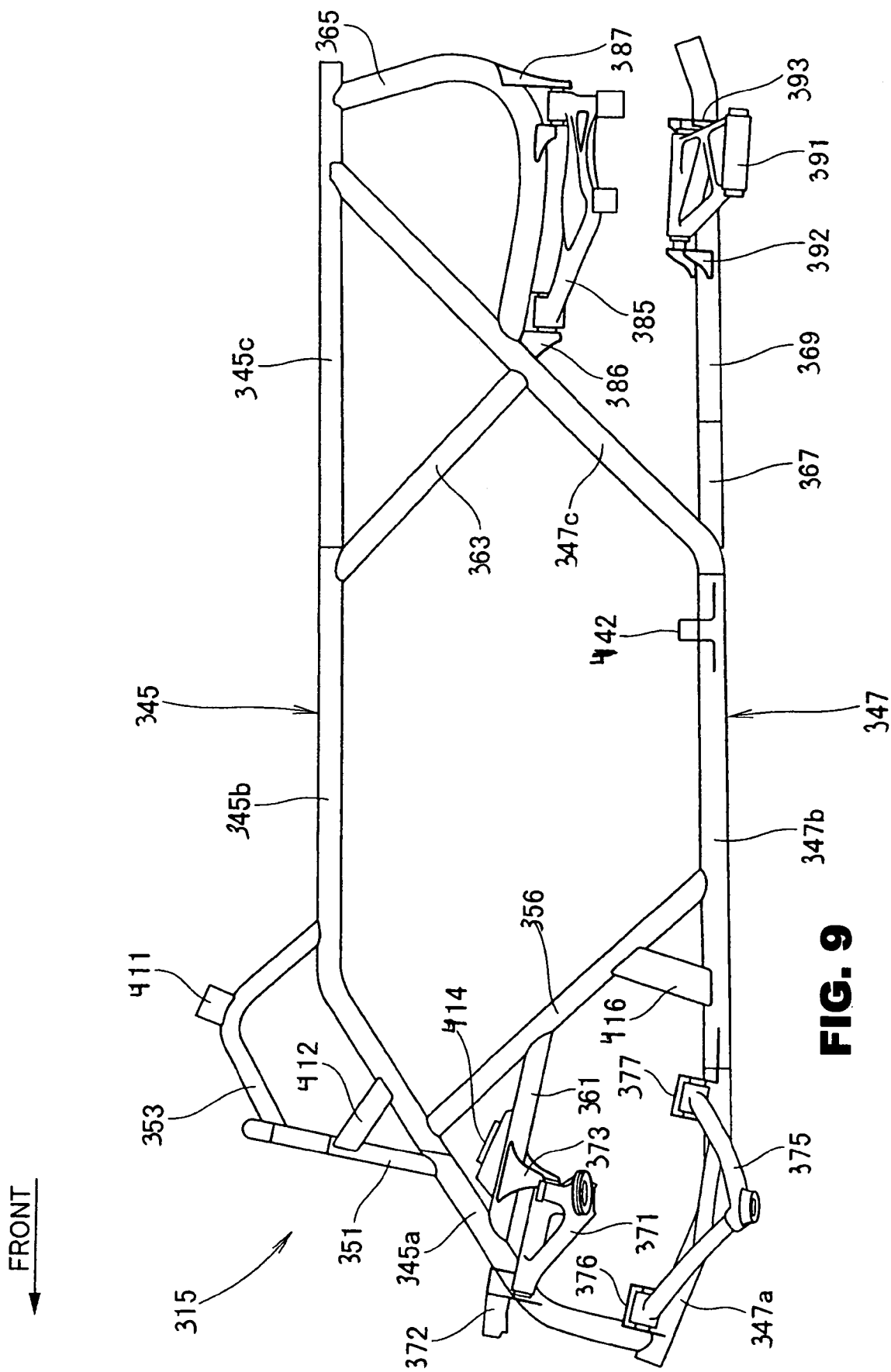
FIG. 9 is a left side view of the vehicle body frame according to the present invention.

FIG. 9 is a left side view showing the vehicle body frame according to the present invention, in which the arrow (FRONT) indicates the vehicle front side (here and hereinafter).

The vehicle body frame 315 is composed of: left and right upper main arms 345, 346 (only reference numeral 345 on the viewer's side is shown) extended in the front-rear direction; lower main frames 347, 348 (only reference numeral 347 on the viewer's side is shown) inclined rearwardly upwards which are mounted to front end lower portions and rear portions of the upper main frames 345, 346; front frames 351, 352 (only reference numeral 351 on the viewer's side is shown) raised from respective front portions of the upper main frames 345, 346; L-shaped frames 353, 354 (only reference numeral 353 on the viewer's side is shown) connected respectively to the upper end side of the front frames 351, 352 and the upper portion side of the upper main frames 345, 346; first front inclined frames 356, 357 (only reference numeral 356 on the viewer's side is shown) disposed bridgingly, while being inclined forwardly upwards, respectively between front portions of the upper main frames 345, 346 and the lower main frames 347, 348; second front inclined frames 361, 362 (only reference numeral 361 on the viewer's side is shown) disposed bridgingly, while being inclined forwardly upwards, respectively between front portions of the upper main frames 345, 346 and the first front inclined arms 356, 357; rear inclined frames 363, 364 (only reference numeral 363 on the viewer's side is shown) disposed bridgingly, while being inclined forwardly upwards, respectively between rear portions of the lower main frames 347, 348 and intermediate portions of the upper main frames 345, 346; curved frames 365, 366 (only reference numeral 365 on the viewer's side is shown) disposed bridgingly, while being bent, respectively between rear portions of the lower main frames 347, 348 and rear portions of the upper main frames 345, 346; first rear lower frames 367, 368 (only reference numeral 367 on the viewer's side is shown) extended rearwards from rear lower portions of the lower main frames 347, 348; and second rear lower frames 369, 370 (only reference numeral 369 on the viewer's side is shown) extended further rearwards from the first rear lower frames 367, 368.

The upper main frames 345, 346 are members formed by joining after splitting in the vicinity of mount portions of the front frames 351, 352 and in the vicinity of mount portions of the rear inclined frames 363, 364, specifically, splitting respectively into a front upper frame 345a, a middle upper frame 345b and a rear upper frame 345c, and into a front upper frame 346a (not shown), a middle upper frame 346b (not shown) and a rear upper frame 346c (not shown).

In addition, the lower main frames 347 and 348 are members formed by joining after splitting respectively into three members each, specifically, splitting respectively into a front lower frame 347a, a middle lower frame 347b and a rear lower frame 347c, and into a front lower frame 348a (not shown), a middle lower frame 348b (not shown) and a rear lower frame 348c (not shown).

In the figure, reference numeral 371 denotes a left upper arm as a suspension arm for supporting the front wheel 11 (see FIG. 1.) The left upper arm 371 is vertically movably supported by one end of a front first arm support bracket 372 disposed between left and right front upper frames 345a, 346a and by a front second arm support bracket 373 mounted to the second front inclined frames 361, 362.

Reference numeral 375 is a left lower arm as a suspension arm for supporting the front wheel 11. The left lower arm 375 is vertically movably supported by one end of a third arm support bracket 376 disposed bridgingly between a front-side lower frame 347a and a front-side lower frame 348a and by one end of a front fourth arm support bracket 377 similarly disposed bridgingly between the front-side lower frame 347a and the front-side lower frame 348a.

In addition, a right upper arm 381 (not shown, and will be described referring to FIG. 11) as a suspension arm for supporting the front wheel 12 (see FIG. 1) is vertically movably supported by the other end of the first arm support bracket 372 and by a front second arm support bracket 374 (not shown) mounted to the second front inclined frame 362 (not shown).

A right lower arm 382 (not shown, and will be described referring to FIG. 12) as a suspension arm for supporting the front wheel 12 is vertically movably supported by the other end of a third arm support bracket 376 and by the other end of a fourth arm support bracket 377.

Reference numeral 385 denotes a left upper arm as a suspension arm for supporting the rear wheel 13 (see FIG. 1). The left upper arm 385 is vertically movably supported by a rear first arm support bracket 386 mounted to a front end portion of the curved frame 365 and by a rear second arm support bracket 387 mounted to a rear lower portion of the curved frame 365.

Reference numeral 391 denotes a left lower arm as a suspension arm for supporting the rear wheel 13. The left lower arm 391 is vertically movably supported by a rear third arm support bracket 392 mounted to the second rear lower frame 369 and by a rear fourth arm support bracket 393 similarly mounted to the second rear lower frame 369.

In addition, a right upper arm 395 (not shown, and will be described referring to FIG. 11) as a suspension arm for supporting the rear wheel 14 (not shown) is vertically movably supported by a rear fifth arm support bracket 396 mounted to the curved frame 366 and by a rear sixth arm support bracket 397 (not shown) similarly mounted to the curved frame 366.

A right lower frame 401 (not shown, and will be described referring to FIG. 11) as a suspension arm for supporting the rear wheel 14 is vertically movably supported by a rear seventh arm support bracket 402 mounted to the second rear lower frame 370 and by a rear eighth arm support bracket 403 similarly mounted to the second rear lower frame 370.

Here, reference numeral 411 denotes an upper shaft support portion mounted to the L-shaped frames 353, 354 for the purpose of supporting an upper portion of a steering shaft which will be described later; 412 and 413 (only reference numerals 412 on the viewer's side is shown) denote left and right reinforcement members disposed bridgingly between the front frames 351, 352 and the upper main frames 345, 346; 414 denotes a lower shaft support portion mounted to the second front inclined frames 361, 362 for the purpose of supporting a lower portion of the steering shaft; and 416 and 417 (only reference numeral 416 on the viewer's side is shown) denote left and right reinforcement members disposed bridgingly between the lower main frames 347, 348 and the first front inclined frames 356, 357.

Figure 10:
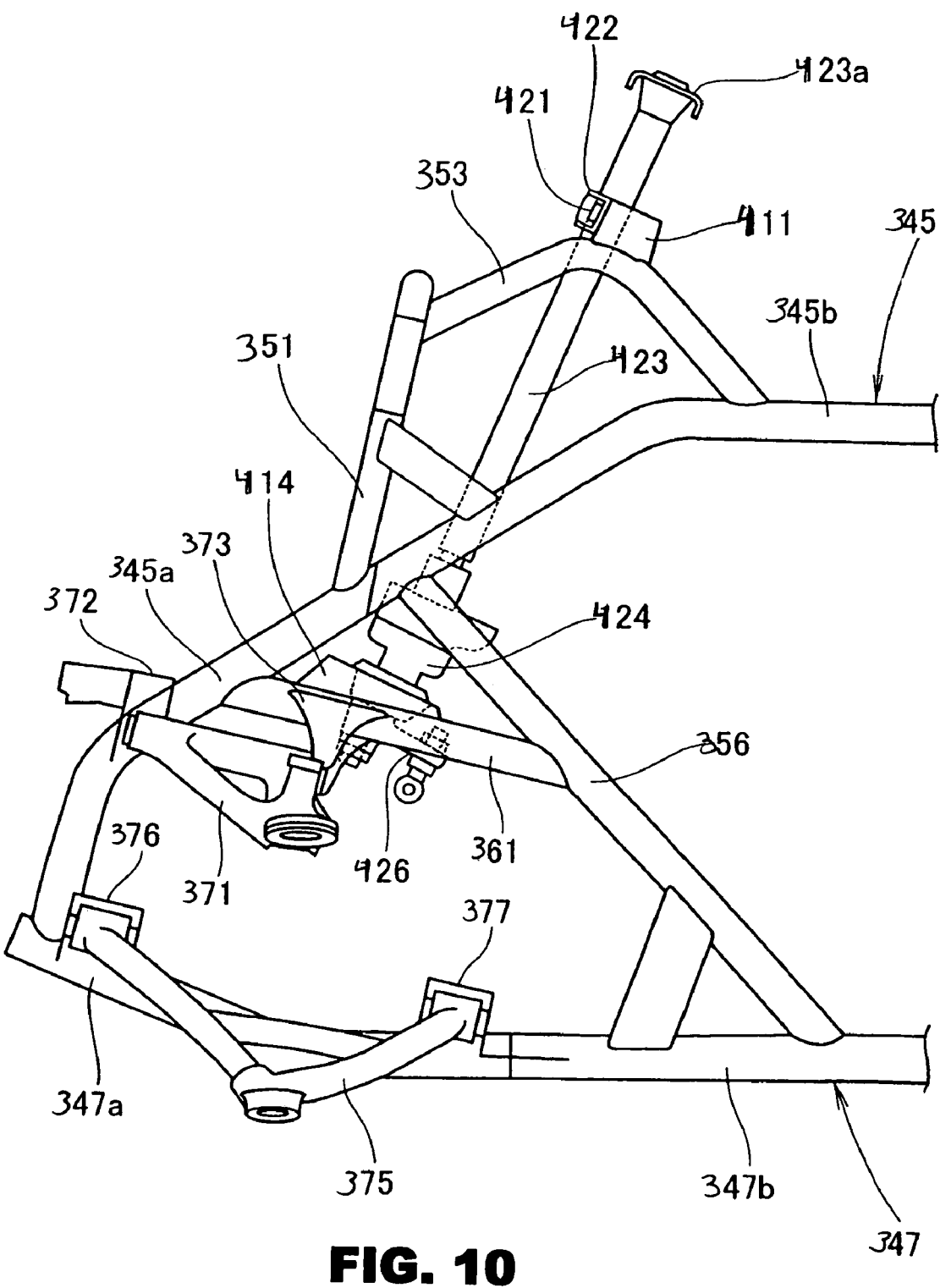
FIG. 10 is a side view showing a steering shaft support condition in the vehicle body frame according to the present invention.

FIG. 10 is a side view showing a steering shaft support condition in the vehicle body frame according to the present invention. The figure shows the condition in which an upper portion of the steering shaft 423 is rotatably supported by the upper shaft support portion 411 disposed bridgingly between the L-shaped frames 353, 354 (only reference numeral 353 on the viewer's side is shown) and by a shaft support bracket 422 mounted to the upper shaft support portion 411 by two bolts 421, and a lower portion of the steering shaft 423 is supported by mounting a shaft support member 424, for rotatably supporting the steering shaft 423, to the lower shaft support portion 414. Incidentally, reference numeral 423a denotes a steering handle bracket mounted to the upper end of the steering shaft 423 for the purpose of mounting the steering handle 26 (see FIG. 1), and reference numeral 426 denotes a steering arm mounted to a lower portion of the steering shaft 423 for the purpose of steering the front wheels 11, 12 (see FIG. 1) through tie rods and knuckles which are not shown.

Figure 11:
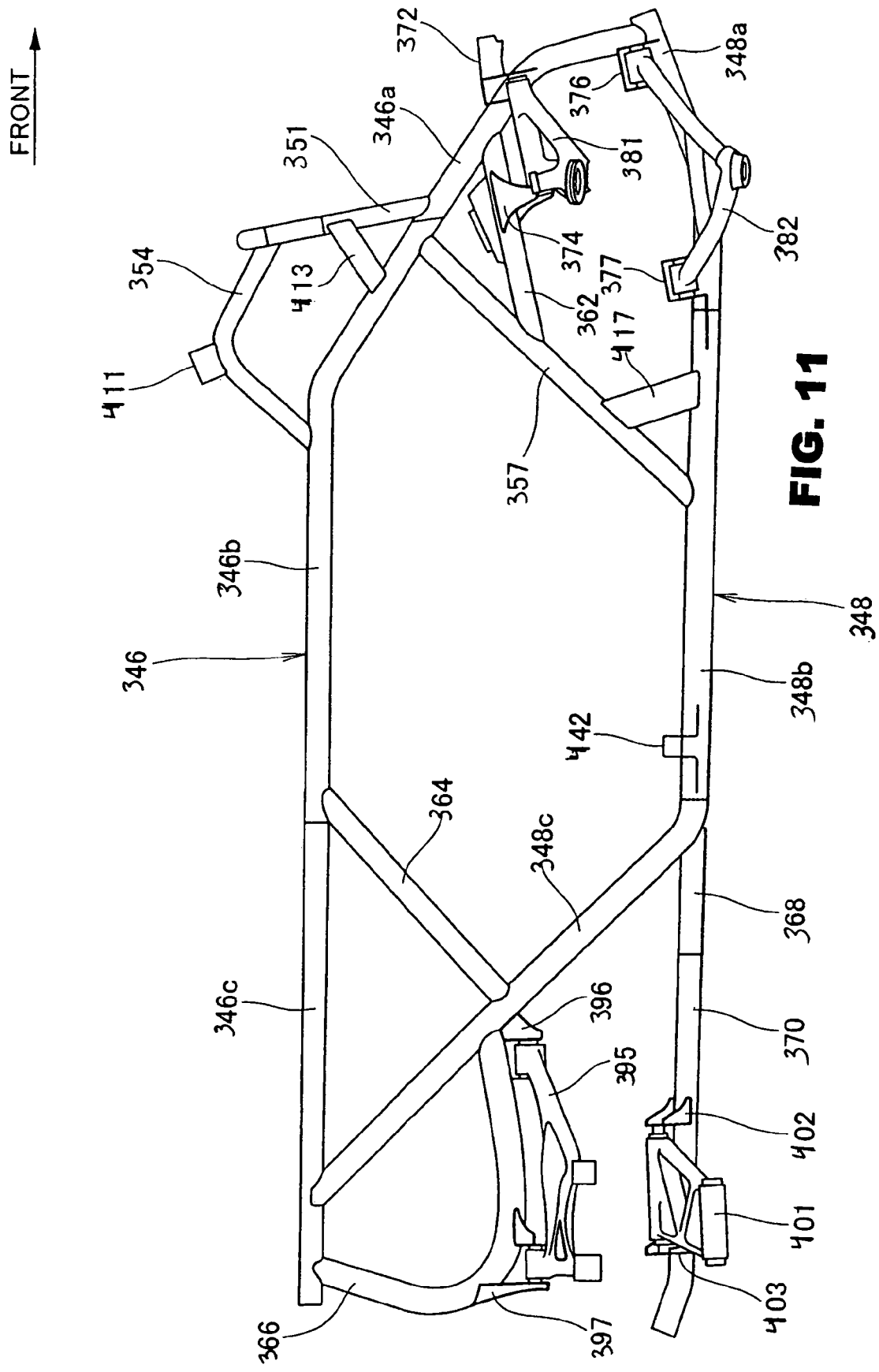
FIG. 11 is a right side view of the vehicle body frame according to the present invention.

FIG. 11 is a right side view of the vehicle body frame according to the present invention, showing that the right upper arm 381 for supporting the front wheel 12 (see FIG. 1) is vertically movably supported by the other end of the front first arm support bracket 372 and by the front second arm support bracket 374 mounted to the second front inclined frame 362, whereas the right lower arm 382 as a suspension arm for supporting the front wheel 12 is vertically movably supported by the other end of the front third arm support bracket 376 and by the other end of the front fourth arm support bracket 377.

In addition, the figure shows that the right upper arm 395 as a suspension arm for supporting the rear wheel 14 (not shown) is vertically movably supported by the rear fifth arm support bracket 396 mounted to the curved frame 366 and by the rear sixth arm support bracket 397 similarly mounted to the curved frame 366, whereas the right lower arm 401 as a suspension arm for supporting the rear wheel 14 is vertically movably supported by the rear seventh arm support bracket 402 mounted to the second rear lower frame 370 and by the rear eighth arm support bracket 403 similarly mounted to the second rear lower frame 370.

Figure 12:
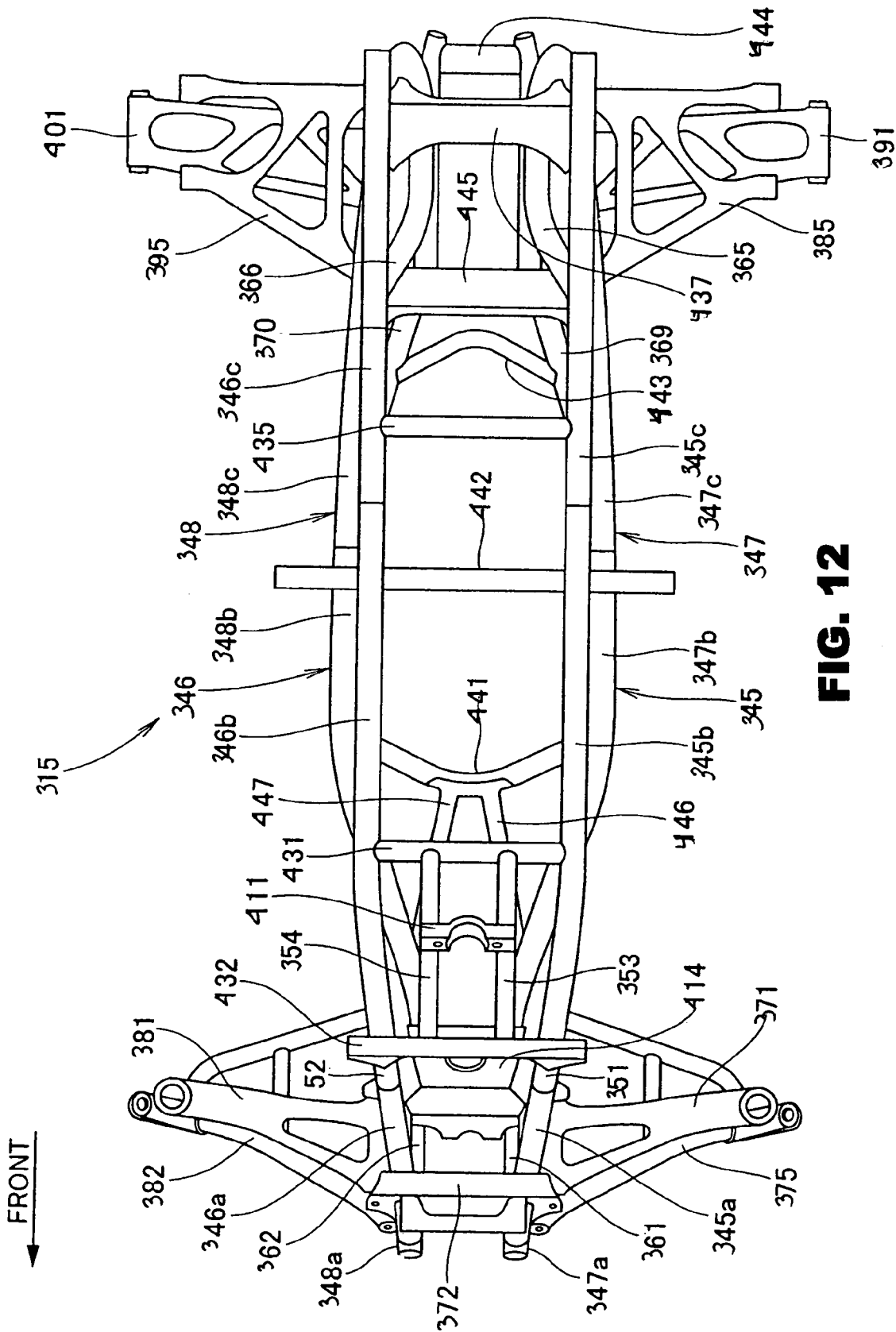
FIG. 12 is a plan view of the vehicle body frame according to the present invention.

FIG. 12 is a plan view of the vehicle body frame according to the present invention.

The vehicle body frame 315 has a structure in which: the upper main frames 345, 346 are extended so as to be widened rearwards from the front ends thereof and extended substantially in parallel rearwards from intermediate positions of front portions thereof; a first upper cross member 431 is disposed bridgingly between the upper main frames 345, 346; an upper bracket 432 is disposed bridgingly between the left and right front frames 351, 352; the L-shaped frames 353, 354 are disposed bridgingly, substantially in parallel, between the first upper cross member 431 and the upper bracket 432; the upper shaft support portion 411 is disposed bridgingly between the L-shaped frames 353, 354; and the lower shaft support portion 414 is disposed bridgingly between the left and right second front inclined frames 361, 362. In the figure, the left upper arm 371, the left lower arm 375, the right upper arm 81 and the right lower arm 382 for supporting the front wheels 11, 12 (see FIG. 1) are respectively extended to the vehicle lateral sides, and the left upper arm 385, the left lower arm 391, the right upper arm 395 and the right lower arm 401 for supporting the rear wheels 13, 14 (see FIG. 1; reference numeral 14 is not shown) are respectively extended to the vehicle lateral sides.

Here, reference numerals 435 and 437 denote a second upper cross member and a first cross plate which are disposed bridgingly between the upper main frames 345, 346; reference numerals 441 and 442 denote a first lower cross member and a second lower cross member which are disposed bridgingly between the lower main frames 347, 348; reference numerals 443 and 444 denote a third lower cross member and a fourth lower cross member which are disposed bridgingly between the second rear lower frames 369, 370; reference numeral 445 denotes a second cross plate disposed bridgingly between the curved frames 365, 366; and reference numerals 446 and 447 denote cross pipes disposed bridgingly, while being inclined, between the first lower cross member 441 and the lower main frames 347, 348.

Figure 13:
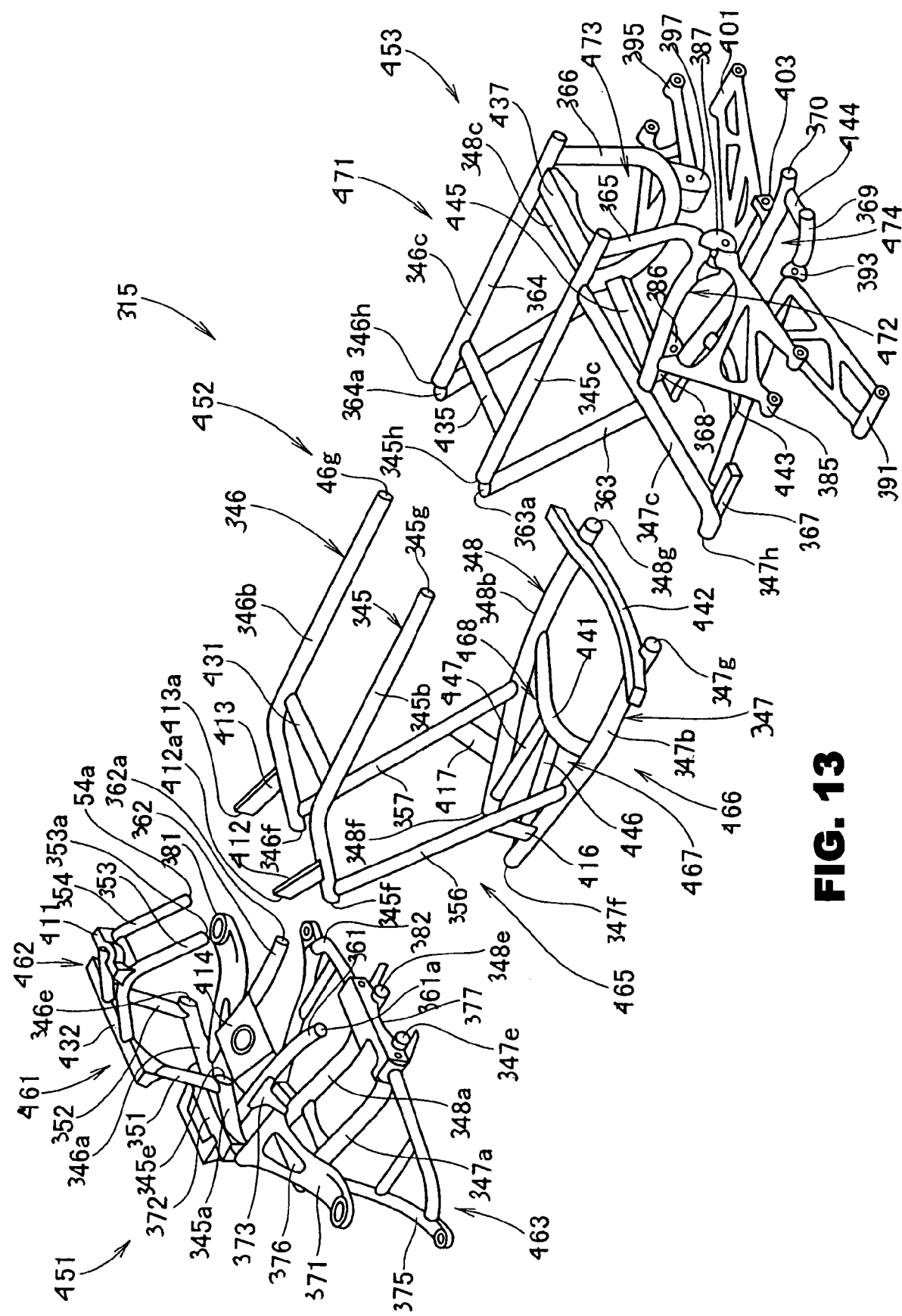
FIG. 13 is a perspective view showing a split structure of the vehicle body frame according to the present invention.

FIG. 13 is a perspective view showing a split structure of the vehicle body frame according to the present invention.

The vehicle body frame 315 is largely trisected along the vehicle front-rear direction into a front frame 451, an intermediate frame 452 connected to a rear portion of the front frame 451, and a rear frame 453 connected to a rear portion of the intermediate frame 452, in this order from the front side.

For example, the front frame 451, the intermediate frame 452 and the rear frame 453 are preliminarily assembled in respective separate sub production lines, and the front frame 451, the intermediate frame 452 and the rear frame 453 are assembled to each other in the next main production line, whereby the respective frames 451, 452, 453 are made smaller in size, the number of component parts is reduced, the assembly is facilitated, and the assembly time of the vehicle body frame 315 as a whole can be shortened, as compared with the case where the vehicle body frame 315 is assembled in one production line from the beginning. This is the reason why the vehicle body frame 315 is composed of separate frames.

The front frame 451 is composed of the front upper frames 345a, 346a, the front lower frames 347a, 348a, the front frames 351, 352, the L-shaped frames 353, 354, the second front inclined frames 361, 362, the front first arm support bracket 372, the front second arm support brackets 373, 374 (for reference numeral 374, refer to FIG. 11), the front third arm support bracket 376, the front fourth arm support bracket 377, the upper shaft support portion 411, the lower shaft support portion 414, and the upper bracket 432.

Here, reference numerals 345e and 346e denote front first connection portions provided at the rear ends of the front upper frames 345a, 346a, for connection to middle upper frames 345b, 346b in the intermediate frame 452; reference numerals 347e and 348e denote front second connection portions provided at the rear ends of the front lower frames 347a, 348a, for connection to middle lower frames 347b, 348b in the intermediate frame 452; reference numerals 353a, 354a denote front third connection portions provided at the rear ends of the L-shaped frames 353, 354, for connection to the first upper cross member 431 in the intermediate frame 452; and reference numerals 361a and 362a denote front fourth connection portions provided at the rear ends of the second front inclined frames 361, 362, for connection to the first front inclined frames 356, 357 in the intermediate frame 452.

The front upper frames 345a, 346a, the front frames 351, 352, the front first arm support bracket 372, and the upper bracket 432 in the front frame 451 are members forming a front first closed loop 461.

The L-shaped frames 353, 354, the upper shaft support portion 411 and the upper bracket 432 in the front frame 451 are members forming a front second closed loop 462.

The front lower frames 347a, 348a, the front third arm support bracket 376 and the front fourth arm support bracket 377 in the front frame 451 are members forming a front third closed loop 463.

The intermediate frame 452 is composed of the middle upper frames 345b, 346b, the middle lower frames 347b, 348b, the first front inclined frames 356, 357, the reinforcement members 412, 413, the reinforcement members 416, 417, the first upper cross member 431, the first lower cross member 441, the second lower cross member 442, and the cross pipes 446, 447.

Here, reference numerals 345f, 346f denote intermediate first connection portions provided at the front ends of the middle upper frames 345b, 346b, for connection to the front first connection portions 345e, 346e in the front frame 451; reference numerals 347f, 348f denote intermediate second connection portions provided at the front ends of the middle lower frames 347b, 348b, for connection to the front second connection portions 347e, 348e in the front frame 451; and reference numerals 412a, 413a denote intermediate third connection portions provided at the front ends of the reinforcement members 412, 413, for connection to the front frames 351, 352 in the front frame 451.

In addition, reference numerals 345g, 346g denote intermediate fourth connection portions provided at the rear ends of the middle upper frames 345b, 346b, for connection to the rear frame 453, and reference numerals 347g, 348g denote intermediate fifth connection portions provided at the rear ends of the middle frames 347b, 348b, for connection to the rear frame 453.

The middle upper frames 345b, 346b, the middle lower frames 347b, 348b, the first front inclined frames 356, 357, the first upper cross member 431 and the first lower cross member 441 in the intermediate frame 452 are members forming the intermediate first closed loop 465.

The middle lower frames 347b, 348b, the first lower cross member 441 and the second lower cross member 442 in the intermediate frame 452 are members forming an intermediate second closed loop 466.

The middle lower frame 347b, the first lower cross member 441 and the cross pipe 446 in the intermediate frame 452 are members forming an intermediate third closed loop 467.

The middle lower frame 348b, the first lower cross member 441 and the cross pipe 447 in the intermediate frame 452 are members forming an intermediate fourth closed loop 468.

The rear frame 453 is composed of the rear upper frames 345c, 346c, the rear lower frames 347c, 348c, the rear inclined frames 363, 364, the curved frames 365, 366, the first rear lower frames 367, 368, the second rear lower frames 369, 370, the rear first arm support bracket 386, the rear second arm support bracket 387, the rear third arm support bracket 392 (not shown), the rear fourth arm support bracket 393, the rear fifth arm support bracket 396 (not shown), the rear sixth arm support bracket 397, the rear seventh arm support bracket 402 (not shown), the rear eighth arm support bracket 403, the second upper cross member 435, the first cross plate 437, the third lower cross member 443, the fourth lower cross member 444, and the second cross plate 445.

Here, reference numerals 345h, 346h denote rear first connection portions provided at the front ends of the rear upper frames 345c, 346c, for connection to the intermediate fourth connection portions 345g, 346g in the intermediate frame 452; reference numerals 347h, 348h (reference numeral 348h is not shown) denote rear second connection portions provided at the front ends of the rear lower frames 347c, 348c, for connection to the intermediate fifth connection portions 347g, 348g in the intermediate frame 452; and reference numerals 363a, 364a denote rear third connection portions provided at the front ends of the rear inclined frames 363, 364, for connection to the middle upper frames 345b, 346b in the intermediate frame 452.

The rear upper frames 345c, 346c, the second upper cross member 435 and the first cross plate 437 in the rear frame 453 are members forming a rear first closed loop 471.

The rear upper frame 345c, the rear lower frame 347c and the curved frame 365 in the rear frame 453 are members forming a rear second closed loop 472.

The rear upper frame 346c, the rear lower frame 348c and the curved frame 366 in the rear frame 453 are members forming a rear third closed loop 473.

The second rear lower frames 369, 370, the third lower cross member 443 and the fourth lower cross member 444 in the rear frame 453 are members forming a rear fourth closed loop 474.

As has been mentioned above, the front frame 451 includes the upper shaft support portion 411 and the lower shaft support portion 414 for supporting the steering shaft 423 (see FIG. 10), and includes the front first arm support bracket 372, the front second arm support brackets 373, 374 (for reference numeral 374, refer to FIG. 11), the front third arm support bracket 376, and the front fourth arm support bracket 377 for supporting the suspension arms (namely, the left upper arm 371, the left lower arm 375, the right upper arm 381, and the right lower arm 382).

In addition, the rear frame 453 includes the rear first arm support bracket 386, the rear second arm support bracket 387, the rear third arm support bracket 392 (see FIG. 10), the rear fourth arm support bracket 393, the rear fifth arm support bracket (see FIG. 12), the rear sixth arm support bracket 397, the rear seventh arm support bracket 402 (see FIG. 12), and the rear eighth arm support bracket 403 for supporting the suspensions, i.e., the left upper arm 385, the left lower arm 391, the right upper arm 395, and the right lower arm 401.

Figure 14:
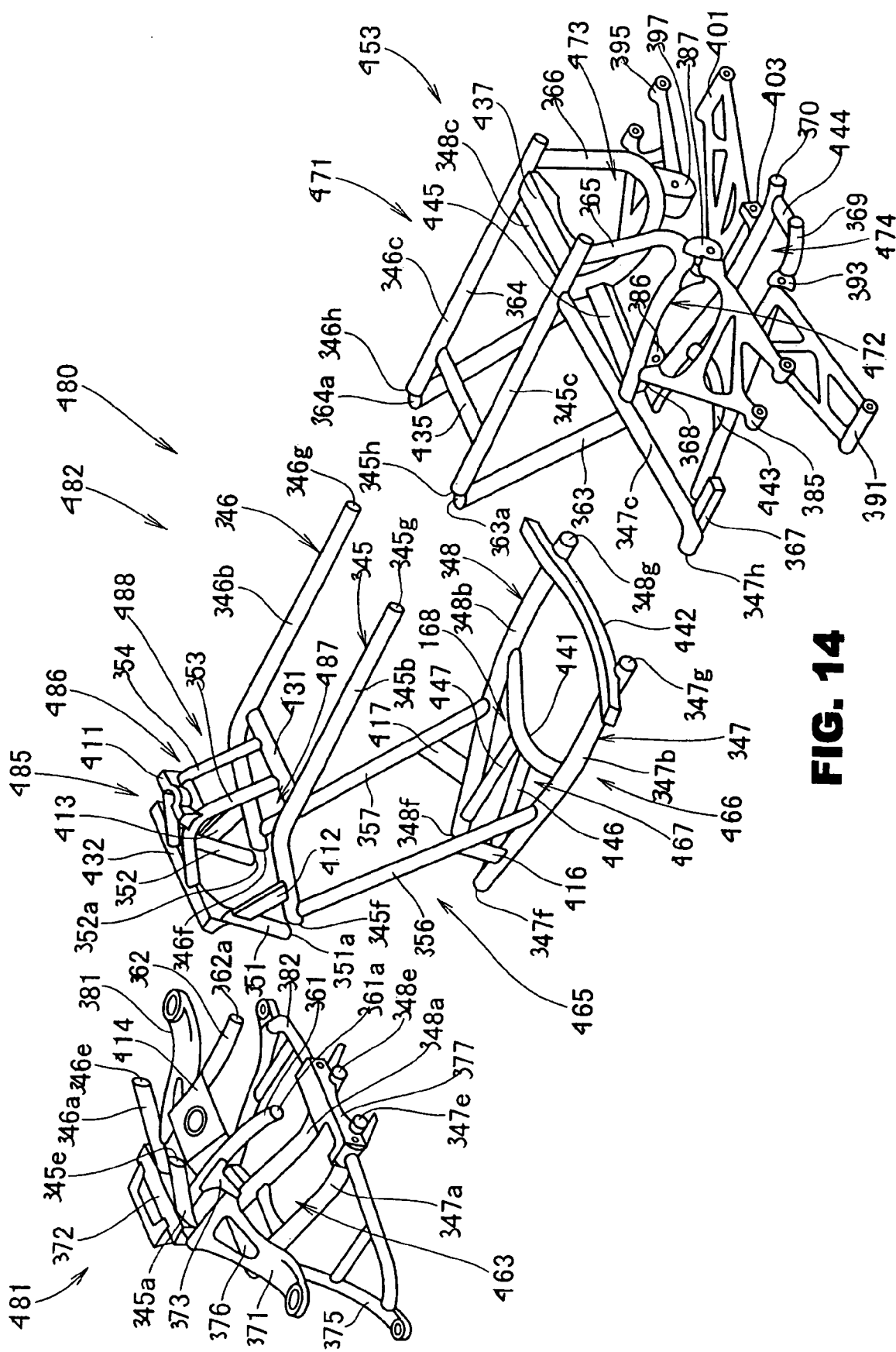
FIG. 14 is a perspective view showing another embodiment of the split structure of the vehicle body frame according to the present invention.

FIG. 14 is a perspective view showing another embodiment of the split structure of the vehicle body frame according to the present invention.

The vehicle body frame 480 is largely trisected along the vehicle front-rear direction, into a front frame 481, an intermediate frame 482 connected to a rear portion of the front frame 481, and a rear frame 453 connected to a rear portion of the intermediate frame 482, in this order from the front side.

The front frame 481 is composed of the front upper frames 345a, 346a, the front lower frames 347a, 348a, the second front inclined frames 361, 362, the front first arm support bracket 372, the front second arm support brackets 373, 374 (for reference numeral 374, refer to FIG. 11), the front third arm support bracket 376, the front fourth arm support bracket 377 and the lower shaft support portion 414, and includes a front third closed loop 463 constituted of the front lower frames 347a, 348a, the front third arm support bracket 376 and the front fourth arm support bracket 377 in the front frame 481.

The intermediate frame 482 is composed of the middle upper frames 345b, 346b, the middle lower frames 347b, 348b, the front frames 351, 352, the L-shaped frames 353, 354, the first front inclined frames 356, 357, the upper shaft support portion 411, the reinforcement members 412, 413, the reinforcement members 416, 417, the first upper cross member 431, the upper bracket 432, the first lower cross member 441, the second lower cross member 442 and the cross pipes 446, 447. In addition to the intermediate first closed loop 465, the intermediate second closed loop 466, the intermediate third closed loop 467, the intermediate fourth closed loop 468, and the intermediate fifth closed loop 485 (namely, the front first closed loop 462), the intermediate frame 482 includes an intermediate sixth closed loop 486 constituted of the L-shaped frames 353, 354, the upper shaft support portion 411 and the first upper cross member 431, an intermediate seventh closed loop 487 constituted of the L-shaped frame 353, the first upper cross member 431, the middle upper frame 345b, the reinforcement member 412, the front frame 351 and the upper bracket 432, and an intermediate eighth closed loop 488 constituted of the L-shaped frame 354, the first upper cross member 431, the middle upper frame 346b, the reinforcement member 413, the front frame 352 and the upper bracket 432. Incidentally, reference numerals 351a, 352a denote intermediate sixth connection portions provided at the lower ends of the front frames 351, 352, for connection to the front upper frames 345a, 346a in the front frame 481.

As has been mentioned above, the front frame 481 includes the lower shaft support portion 414 for supporting the steering shaft 423 (see FIG. 10), and includes the front first arm support bracket 372, the front second arm support brackets 373, 374 (for reference numeral 374, refer to FIG. 11), the front third arm support bracket 376 and the front fourth arm support bracket 377 for supporting the suspension arms (namely, the left upper arm 371, the left lower arm 375, the right upper arm 381, and the right lower arm 382).

In addition, the intermediate frame 482 includes the upper shaft support portion 411 for supporting the steering shaft 423.

As has been described referring to FIGS. 11 and 13 above, the all terrain vehicle 10 (see FIG. 1) including the rear upper arm support portions (namely, the rear first arm support bracket 386, the rear second arm support bracket 387, the rear fifth arm support bracket 396, and the rear sixth arm support bracket 397) and the rear lower arm support portions (namely, the rear third arm support bracket 392, the rear forth arm support bracket 393, the rear seventh arm support bracket 402, and the rear eighth arm support bracket 403) provided at rear portions of the vehicle body frame 15 for the purpose of supporting the upper and lower suspension arms (namely, the left upper arm 385, the left lower arm 391, the right upper arm 395, and the right lower arm 401) for independently suspending the left and right rear wheels 13, 14 (see FIG. 1; reference numeral 14 is not shown), the vehicle body frame 315 is split into a plurality of assemblies (namely, the front frame 451, the intermediate frame 452, and the rear frame 453), and the rear upper arm support portions 386, 387, 396, 397 and the rear lower arm support portions 392, 393, 402, 403 are included in one of the assemblies 451 to 453 (namely, the rear frame 453 as the rear assembly).

Since the vehicle body frame 15 is split into the plurality of assemblies 451, 452, 453 and the rear upper arm support portions 386, 387, 396, 397 and the rear lower arm support portions 392, 393, 402, 403 are included in the rear frame 453 constituting one of the assemblies 451, 452, 453, it is possible to further enhance the positional accuracies of the rear upper arm support portions 386, 387, 396, 397 and the rear lower arm support portions 392, 393, 402, 403, to enhance the accuracy of mounting the upper and lower suspension arms 385, 391, 395, 401 onto the rear upper arm support portions 386, 387, 396, 397 and the rear lower arm support portions 392, 393, 402, 403, and to easily set the wheel alignment of the rear wheels 13, 14 into a predetermined range.

In addition, the assembly which does not include the rear upper arm support portion 386, 387, 396, 397 and the rear lower arm support portions 392, 393, 402, 403 and which does not need high assembly accuracy, i.e., the intermediate frame 452 can itself be easily assembled, and the cost of the vehicle body frame 15 can be thereby reduced.

In another embodiment of the present invention, as has been described referring to FIGS. 9 to 11 and FIG. 13, the vehicle body frame 15 is composed of three assemblies consisting of the front frame 451 as the front assembly, the rear frame 453 as the rear assembly, and the intermediate frame 452 as the intermediate assembly disposed therebetween, and the front frame 451 includes the shaft support portions (namely, the upper shaft support portion 411, and the lower shaft support portion 414) for supporting the steering shaft 423 (see FIG. 10), and the front upper arm support portions (namely, the front first arm support bracket 372, and the front second arm support brackets 373, 374) and the front lower arm support portions (namely, the front third arm support bracket 376, and the front fourth arm support bracket 377) for supporting the upper and lower suspension arms (namely, the left upper arm 371, the left lower arm 375, the right upper arm 381, and the right lower arm 382) for independently suspending the left and right front wheels 11, 12 (see FIG. 1).

Since the front frame 451 includes the shaft support portions 411, 414 as well as the front upper arm support portions 372, 373, 374 and the front lower arm support portions 376, 377, it is possible to further enhance the positional accuracies of the front upper arm support portions 372, 373, 374 and the front lower arm support portions 376, 377, to enhance the accuracy of mounting the upper and lower suspension arms 371, 375, 381, 382 onto the front upper arm support portions 372, 373, 374 and the front lower arm support portions 376, 377, and to easily set the wheel alignment of the front wheels 11, 12 into a predetermined range.

Further, since the shaft support portions 411, 414, the front upper arm support portions 372, 373, 374 and the front lower arm support portions 376, 377 are collectively included in one assembly, i.e., the front frame 451, not any portion needing a high positional accuracy and a high mounting accuracy is disposed ranging from one into the other of the front frame 451 and the intermediate frame 452, so that the front frame 451 and the intermediate frame 452 can be easily mounted onto each other, the assemblability of the vehicle body frame 15 can be enhanced, and the cost of the vehicle body frame 15 can be reduced.

In another embodiment of the present invention, as has been described referring to FIGS. 9 to 11 and FIG. 14, the vehicle body frame 480 is composed of three assemblies consisting of the front frame 481 as the front assembly, the rear frame 453 as the rear assembly, and the intermediate frame 482 as the intermediate assembly disposed therebetween, and the intermediate frame 482 includes a part of the shaft support portions for supporting the steering shaft 423 (see FIG. 10), namely, the upper shaft support portion 411.

Since the intermediate frame 482 includes the upper shaft support portion 411, the upper shaft support portion 411 can be supported by the intermediate frame 482 enhanced in rigidity by being clamped between the front frame 481 and the rear frame 453, and the steering shaft 423 can be firmly supported.

In another embodiment of the present invention, as has been described referring to FIGS. 13 and 14, the front frame 451, 481, the rear frame 453 and the intermediate frame 452, 482 are each provided with at least one closed loop (namely, the front first closed loop 461, the front second closed loop 462, the front third closed loop 463, the intermediate first closed loop 465, the intermediate second closed loop 466, the intermediate third closed loop 467, the intermediate fourth closed loop 468, the rear first closed loop 471, the rear second closed loop 472, the rear third closed loop 473, the rear fourth closed loop 474, the intermediate fifth closed loop 485, the intermediate sixth closed loop 486, the intermediate seventh closed loop 487, and the intermediate eighth closed loop 488).

Since the front frame 451, 481, the rear frame 453 and the intermediate frame 452, 482 are each provided with at least one closed loop 461 to 463, 465 to 468, 471 to 474, 485 to 488, it is possible to enhance the respective rigidities of the front frame 451, 481, the rear frame 453 and the intermediate frame 452, 482, and to enhance the support rigidities of the suspension arms 371, 375, 381, 382, 385, 391, 395, 401 and the steering shaft 423.

Figure 15:
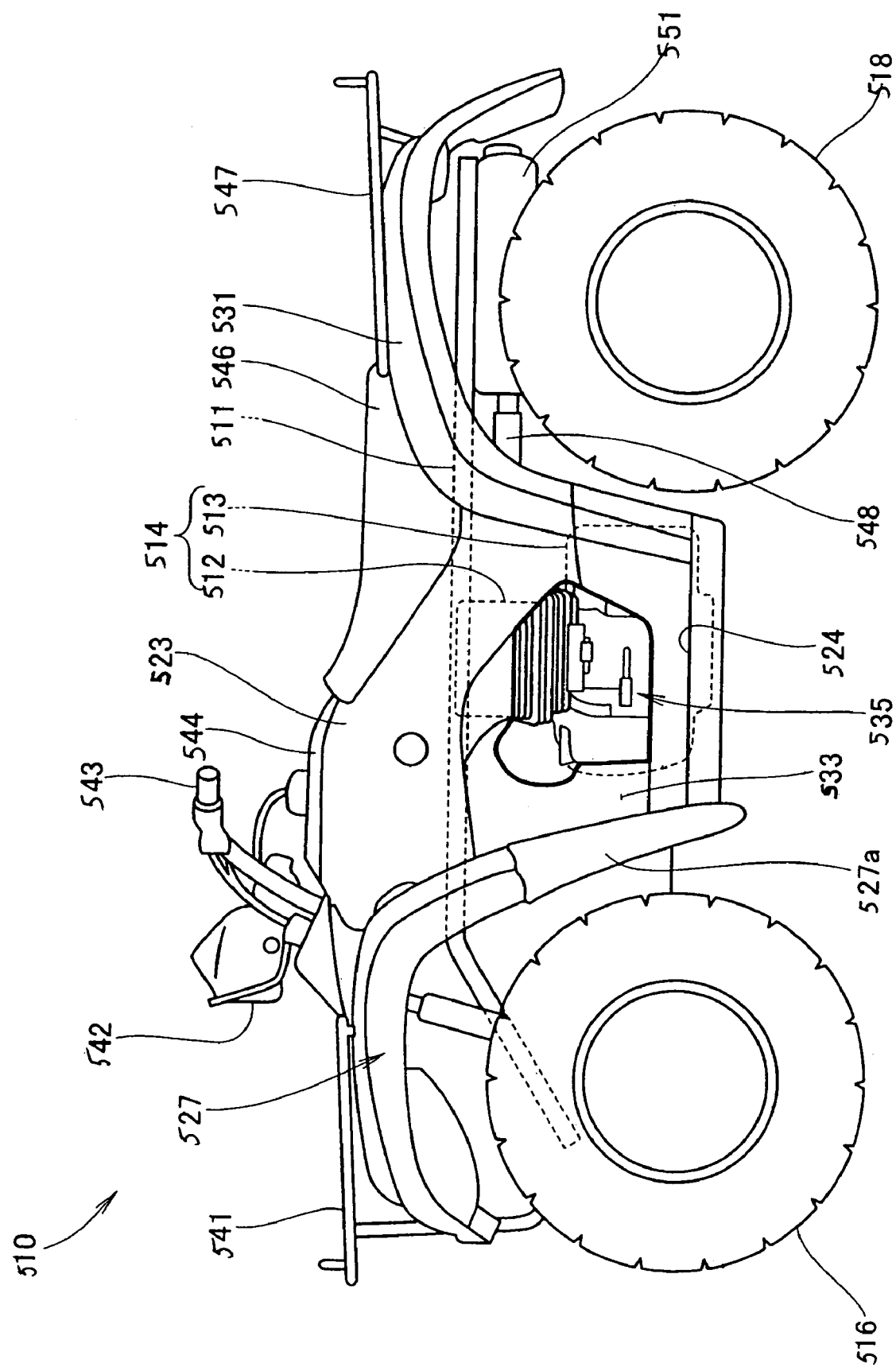
FIG. 15 is a side view showing another embodiment of an ATV according to the present invention.

FIG. 15 is a side view of an ATV according to the present invention, wherein the ATV 510 has a structure in which: a power unit 514 composed of an engine 512 and a transmission 513 is mounted to a roughly central portion of a vehicle body frame 511 extended in the vehicle body front-rear direction; left and right front wheels 516 and 517 (only reference numeral 516 on the viewer's side is shown) and left and right rear wheels 518 and 521 (only reference numeral 518 on the viewer's side is shown) are connected to the power unit 514 through a power transmission mechanism (not shown) to thereby form a structure for driving the front wheels 516, 517 and the rear wheels 518, 521; the lateral upper sides of the power unit 514 are covered with a body cover 523; floor steps 524 and 525 (only reference numeral 524 on the viewer's side is shown) for the driver to put his/her feet thereon are disposed on the lateral lower sides of the power unit 514; the upper and rear sides of the front wheels 516, 517 are covered with front fenders 527, 528 (only reference numeral 527 on the viewer's side is shown); the front and upper sides of the rear wheels 518, 521 are covered with rear fenders 531, 532 (only reference numeral 531 on the viewer's side is shown); a front lateral side of the power unit 514, specifically the engine 512, is covered with a cover member 533; and an opening portion 535 (the outline of the opening portion 535 is indicated by heavy lines) is defined by the body cover 523, the floor step 524, and the cover member 533 in a left side surface of the vehicle body. Incidentally, though the cover member 533 is not provided at the right side surface of the vehicle body, a portion corresponding to the cover member may be formed as one body with the body cover 523, the floor step 525 or the front fender 528.

The engine 512 is laid out in a longitudinal posture in which a crankshaft 585 (see FIG. 18) which will be described later is extended in the vehicle front-rear direction.

Here, reference numeral 527a denotes a front outer fender as an outer plate constituting the front fender 527, 541 denotes a front carrier, 542 denotes a headlamp, 543 denotes a steering handle for steering the front wheels 518, 521, 544 denotes a fuel tank, 546 denotes a seat, 547 denotes a rear carrier, 548 denotes an exhaust pipe extended rearwards from the engine 512, and 551 denotes a muffler connected to the rear end of the exhaust pipe 548.

Figure 16:
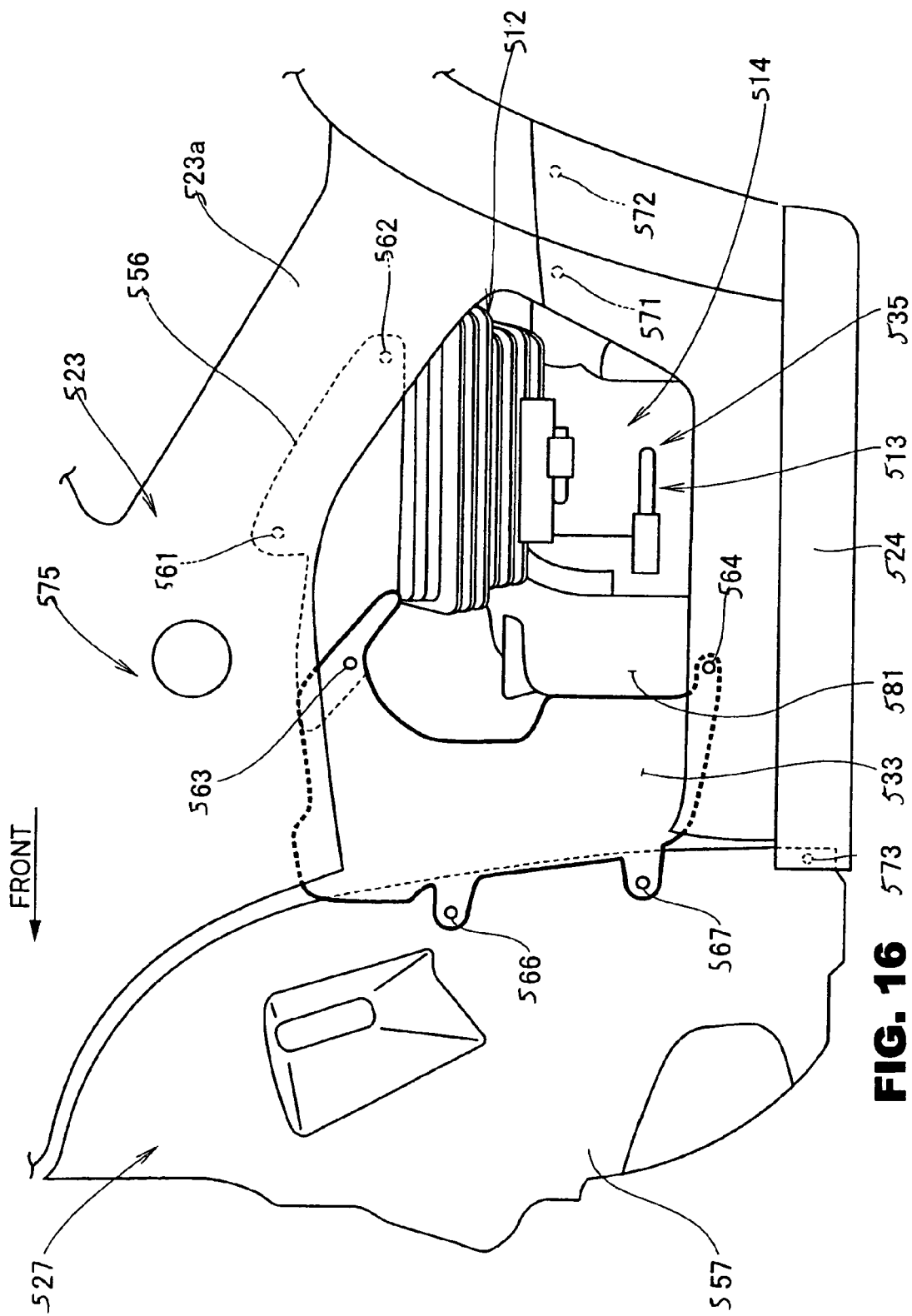
FIG. 16 is a side view showing the left side surface of the vehicle according to the present invention.

FIG. 16 is a side view showing the left side surface of the vehicle according to the present invention (the arrow (FRONT) indicates the vehicle front direction here and hereinafter). The cover member 533 (the outline of the cover member 533 is indicated by heavy lines) is mounted to the body cover 523, specifically a sub cover 556 possessed by the body cover 523, the floor step 524, and a front inner fender 557 as an inner plate constituting the front fender 527 (see FIG. 15), thereby forming the opening portion 535.

In the figure, reference numerals 561 and 562 denote mount portions (specifically, each composed of a small screw, a nut, and a mount hole, here and hereinafter) for mounting the sub cover 556 to a body cover main body 523a constituting the body cover 523, 563 denotes a mount portion for mounting the cover member 533 to the sub cover 556, 564 denotes a mount portion for mounting the cover member 533 to an upper portion of the floor step 524, 566 and 567 denote mount portions for mounting the cover member 533 to the front inner fender 557, 571 and 572 denote mount portions for mounting the floor step 524 to the body cover 523, and 573 denotes a mount portion for mounting the front inner fender 557 to the floor step 524.

The front fender 527 is composed of a front outer fender 527a (see FIG. 15), and the front inner fender 557 disposed on the inside of the front outer fender 527a.

Thus, the cover member 533 is mounted to the three members, i.e., the body cover 523, the floor step 524, the front inner fender 557 possessed by the front fender 527 which are provided in the surroundings of the cover member 533, whereby the rigidity of the cover member 533 itself can be further enhanced, and the rigidity of the body cover 523, the floor step 524, and the front inner fender 557 can also be further enhanced. As a result, the rigidity of a side cover 575 composed of the body cover 523, the floor step 524, the front fender 527 (specifically, the front inner fender 557), and the cover member 533 can be further enhanced.

Figure 17:
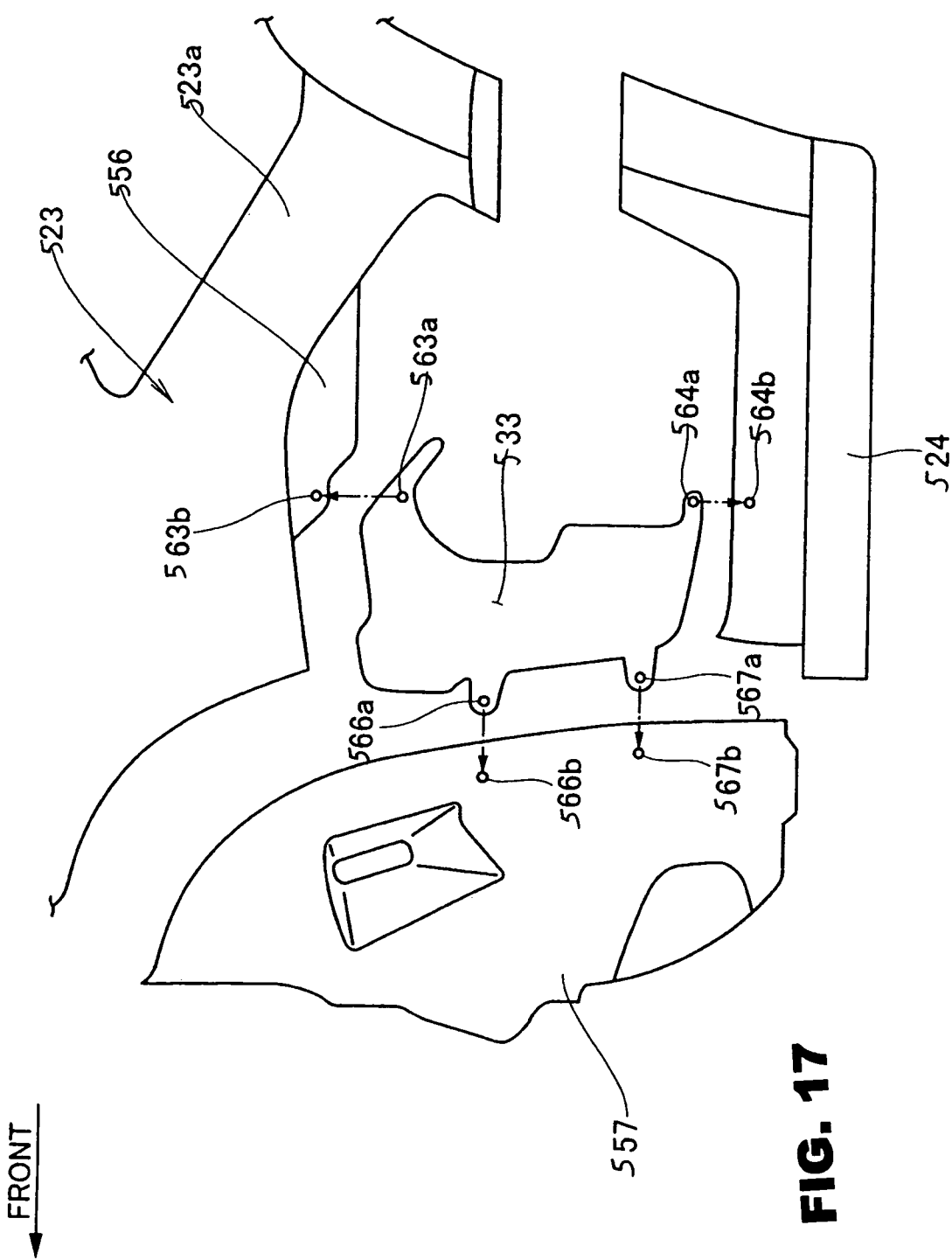
FIG. 17 is an exploded side view of a side cover according to the present invention.

FIG. 17 is an exploded side view of the side cover according to the present invention. Mount holes 563a, 564a, 566a, 567a provided in the cover member 533 are matched respectively to a mount hole 563b in the sub cover 556, a mount hole 564b in the floor step 524, and mount holes 566b, 567b in the front inner fender 557. Bolts (not shown) are inserted respectively in the mount holes, and nuts (now shown) are screw-engaged with the bolts. Thereby, the cover member 533 is mounted to the body cover 523, the floor step 524, and the front inner fender 557.

Figure 18:
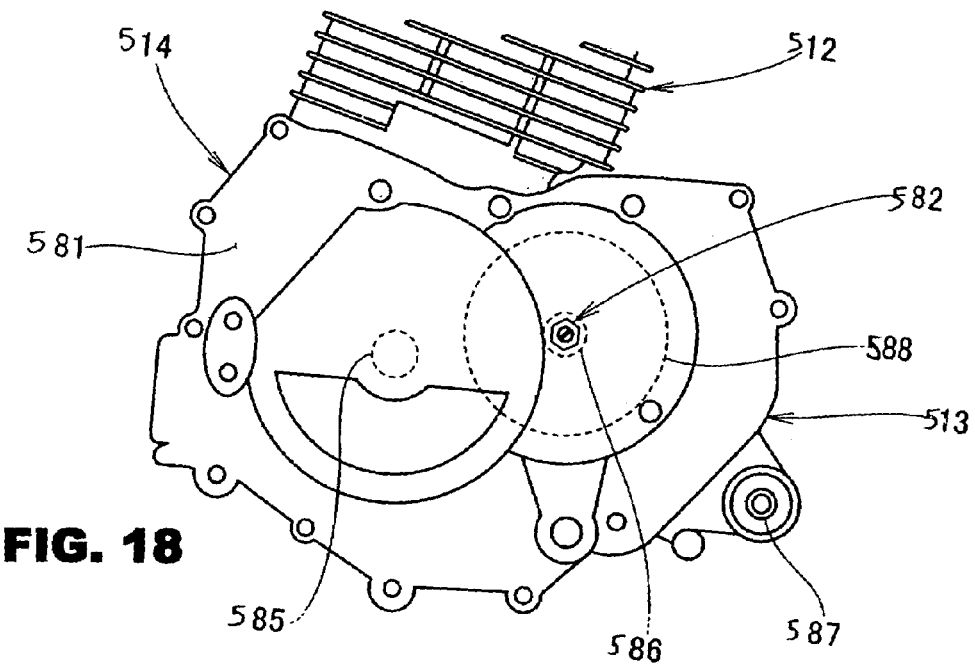
FIG. 18 is a front view of a power unit mounted on the vehicle according to the present invention.

FIG. 18 is a front view of the power unit mounted on the vehicle according to the present invention. The power unit 514 has a structure in which a front portion thereof is covered with a front crankcase cover 581, and a clutch adjusting portion 582 for adjusting the operating position, i.e., a connection-disconnection position of a clutch is projected from the crankcase cover 581.

In the figure, reference numeral 585 denotes a crankshaft extending in the vehicle front-rear direction, 586 denotes a main shaft extended in the vehicle front-rear direction and connected to the crankshaft 585 through a gear, 587 denotes an output shaft to which a propeller shaft for transmitting power to the side of the front wheels 516, 517 (see FIG. 15) is connected, and 588 denotes a wet type multiple disk clutch disposed on the inside of the front crankcase cover 581 and provided at an end portion of the main shaft 586.

The clutch adjusting portion 582 is a mechanism for moving a push rod in the axial direction for changing the pushing force of a spring for pushing input-side disks and output-side disks which are possessed by the clutch 588 and are alternately overlapped with each other.

Figure 19:
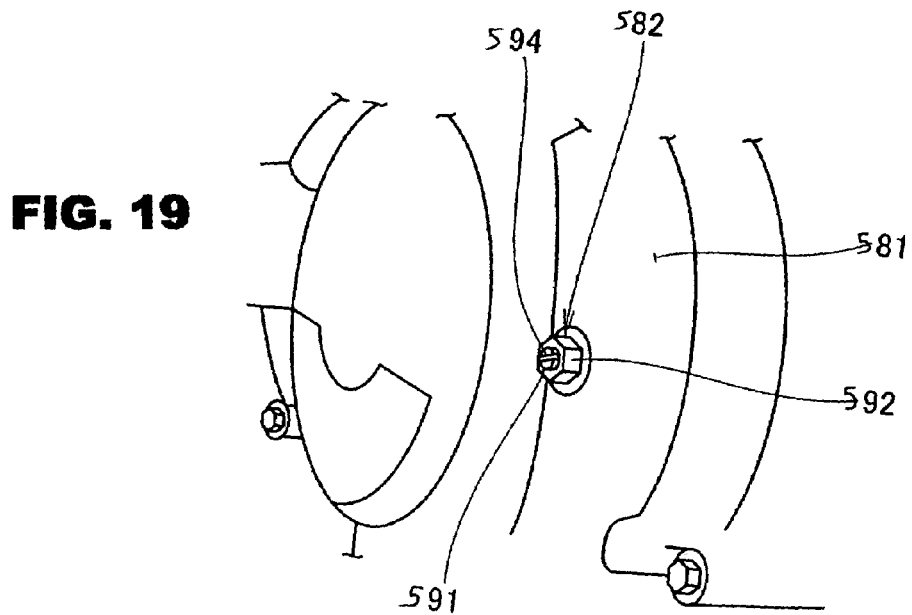
FIG. 19 is a perspective view showing a clutch adjusting portion of the vehicle according to the present invention.

FIG. 19 is a perspective view showing the clutch adjusting portion of the vehicle according to the present invention. The clutch adjusting portion 582 composed of an adjusting bolt 591 and a lock nut 592 for fixing the adjusting bolt 591 is projected from the front crankcase cover 581.

The adjusting bolt 591 is a component part whose one end portion abuts on the bottom end of the above-mentioned push rod, and is provided at its other end portion with a groove 594 for inserting a flat-blade screwdriver therein for turning the adjusting bolt 591.

The functions of the above-described cover member 533 and the clutch adjustment will be described below.

Figure 20:
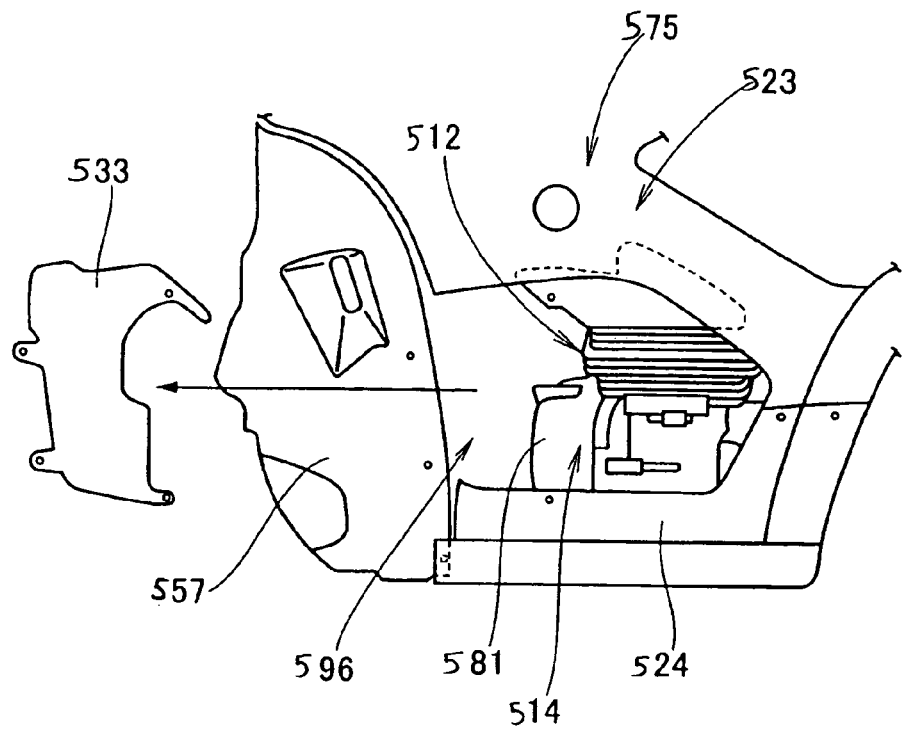
FIG. 20 is a functional view showing the functions of a cover member according to the present invention.

FIG. 20 is a functional view showing the functions of the cover member according to the present invention.

First, the front outer fender 527a (see FIG. 15) is detached. Then, the cover member 533 is detached from the mount portions of the side cover 575, i.e., the body cover 523, the floor step 524, and the front inner fender 557. As a result, an opening portion 596 for largely opening the front lateral sides of the power unit 514 is formed.

Figure 21:
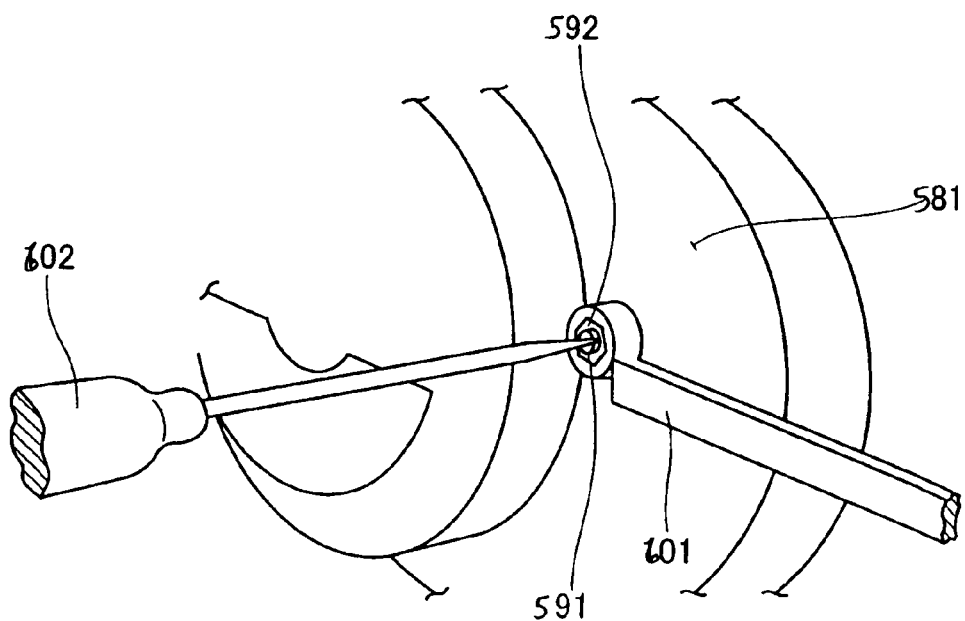
FIG. 21 is a functional view showing an adjustment at the clutch adjusting portion according to the present invention.
Figure 22:
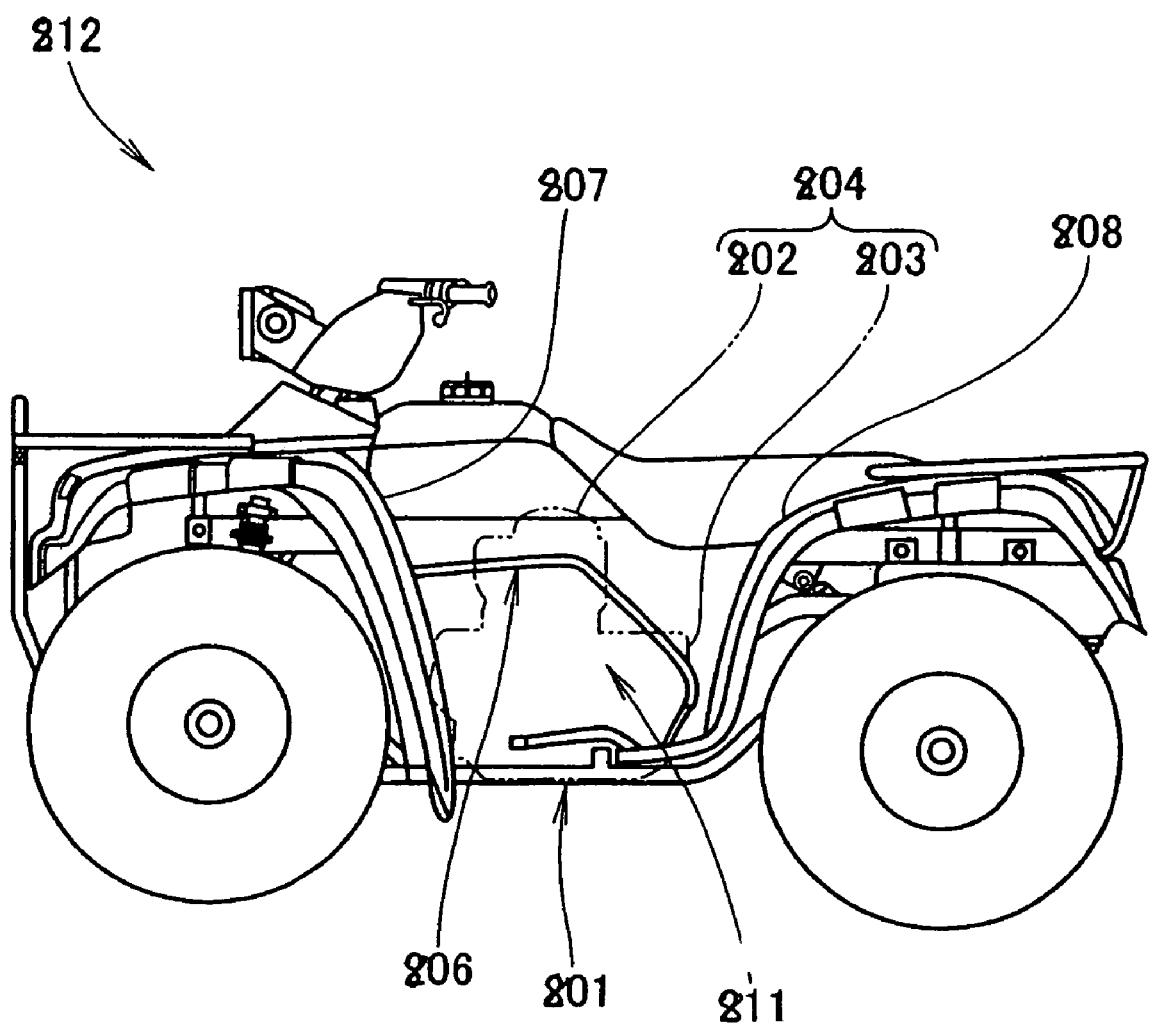
FIG. 22 is a side view of a conventional ATV.

FIG. 21 is a functional view showing the adjustment at the clutch adjusting portion according to the present invention.

A closed wrench 601 and a flat-blade screwdriver 602 are inserted into the inside through the opening portion 596 (see FIG. 20) largely opening in a vehicle body side surface, the closed wrench 601 is fitted over the lock nut 592, the lock nut 592 is unfastened, the flat-blade screwdriver 602 is inserted into the groove 594 (see FIG. 19) in the adjusting bolt 591, and the adjusting bolt 591 is turned, thereby adjusting the operating position of the clutch 588 (see FIG. 18).

Thus, in FIG. 20 in the power unit 514 disposed in the longitudinal posture in which the crankshaft extends toward the vehicle front side, the cover member 533 covering the front lateral sides of the power unit 514 is detached. Thereby, the large opening portion 596 is formed, so that the clutch adjustment can be performed easily, and the maintainability of the power unit 514 can be further enhanced.

In addition, when the cover member 533 is mounted to the body cover 523, the floor step 524, and the front inner fender 557, the smaller opening portion 535 can be formed as shown in FIG. 16, so that the appearance quality of the vehicle body side surface can be enhanced. In addition, an amount of blast via the opening portion 535 to the engine 512 can be secured, and the radiation of heat from the engine 512 can be achieved favorably.

As has been described above referring to FIGS. 15 and 16, in another embodiment, the saddle ride type all terrain vehicle 510 in which the engine 512 is mounted to the vehicle body frame 511, the lateral upper sides of the engine 512 are covered with the body cover 523, the floor steps 524, 525 for the driver to put his/her feet thereon are disposed on the lateral lower sides of the engine 512, and the upper and rear sides of the front wheels 516, 517 driven by the engine 512 are covered with the front fenders 527, 528, the cover member 533 for covering the front lateral sides of the engine 512 is detachably attached to the body cover 523, the floor step 524, and the front fender 527, and the side cover 575 is constituted of the body cover 523, the floor step 524, the front fender 527, and the cover member 533.

With the cover member 533 supported by the body cover 523, the floor step 524, and the front fender 527 which are disposed in the surroundings of the cover member 533, the rigidity of the side cover 575 constituted of the body cover 523, the floor step 524, the front fender 527, and the cover member 533 can be further enhanced, and resonance of the side cover 575 can be prevented.

In addition, by detaching the cover member 533 only, it is possible to simply expose the front portion of the engine 512 to the exterior. Therefore, it is possible, for example, to easily perform an adjustment at the clutch adjusting portion 582 as an operating position adjusting portion for the clutch 588 (see FIG. 15) provided at the front portion of the engine 512, thereby enhancing the maintainability of the power unit 514, particularly, the engine 512.

In another embodiment, the cover member 533 is supported by only the body cover 523, the floor step 524, and the front fender 527.

It is unnecessary, for example to mount the cover member 533, for example, to the vehicle body frame 511 through stays, brackets or the like, and the cover member 533 is only mounted to the respective mount portions of the covers 523, 524, 527. Therefore, the mount structure for the cover member 533 can be simplified, and cost can be reduced.

In another embodiment, the cover member 533 is substantially flush with the body cover 523, the floor step 524, and the front fender 527.

With the cover member 533 being substantially flush with the body cover 523, the floor step 524, and the front fender 527, it is possible to enhance the appearance quality of the side surface of the vehicle 510, and to enhance the commercial value of the vehicle 510.

In another embodiment, the opening portion 535 is defined by the cover member 533, the body cover 523, the floor step 524, and the front fender 527.

With the opening portion 535 being defined by the cover member 533, the body cover 523, the floor step 524, and the front fender 527, it is possible to further reduce the area of the opening portion 535, and to further enhance the aesthetic quality from the lateral side of the vehicle.

Incidentally, while the cover member 533 is mounted to the body cover 523, the floor step 524, and the front inner fender 557 as shown in FIG. 16 in this embodiment, the mount structure is not limited to this structure, and the cover member 533 may be mounted to the body cover 523, the floor step 524 and the front outer fender 527a (see FIG. 15.) In addition, while the power unit 514 is laid out in the longitudinal posture, this layout is not limitative, and the power unit 514 may be laid out in a transverse posture in which the crankshaft 85 is extended in the vehicle width direction. In this detailed description of the invention, reference is made to the accompanying drawings, which form a part hereof, and within which are shown by way of illustration specific embodiments by which the invention may be practiced. It is to be understood that other embodiments may be utilized and structural changes may be made without departing from the scope of the invention.

We claim:

1. A vehicle body frame structure for an all-terrain vehicle having left and right rear wheels, comprising:
    a front assembly;
    a rear assembly;
    an intermediate assembly disposed therebetween said front assembly and said rear assembly;
    a rear upper arm support portion; and
    a rear lower arm support portion, wherein
    said rear upper arm support portion and lower arm support portion are provided on said rear assembly of the vehicle body frame structure, and
    said front assembly, said rear assembly, and said intermediate assembly are each provided with at least one closed loop.

2. A vehicle body frame structure for an all-terrain vehicle as set forth in claim 1, said front assembly further comprising:
    shaft support portions for supporting a steering shaft, and front upper arm support portions and front lower arm support portions for supporting upper and lower suspension arms for independently suspending left and right front wheels.

3. A vehicle body frame structure for all-terrain vehicle as set forth in claim 1, wherein
    said intermediate assembly includes a shaft support portion.

4. A vehicle body frame structure for all-terrain vehicle according to claim 1, wherein said front assembly includes three closed loop structures, said intermediate assembly includes four closed loop structures, and said rear assembly includes four closed loop structures.

* * * * *